(12) United States Patent
Nohara et al.

(10) Patent No.: US 6,980,814 B2
(45) Date of Patent: Dec. 27, 2005

(54) MOBILE COMMUNICATION SYSTEM WITH MOBILE STATION POSITION DETECTION

(75) Inventors: Manabu Nohara, Tsurugashima (JP); Takehiko Shioda, Tsurugashima (JP); Yasuteru Kodama, Tsurugashima (JP); Masami Suzuki, Tsurugashima (JP); Hiroto Inoue, Tsurugashima (JP); Katsunori Arakawa, Tsurugashima (JP); Satoshi Odagawa, Tsurugashima (JP); Osamu Yamazaki, Tsurugashima (JP); Masahiro Okamura, Tsurugashima (JP); Takayuki Akimoto, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 573 days.

(21) Appl. No.: 09/907,503

(22) Filed: Jul. 18, 2001

(65) Prior Publication Data

US 2002/0049063 A1    Apr. 25, 2002

(30) Foreign Application Priority Data

| Jul. 18, 2000 | (JP) | .......................... | 2000-218000 |
|---|---|---|---|
| Jul. 18, 2000 | (JP) | .......................... | 2000-218001 |
| Jul. 18, 2000 | (JP) | .......................... | 2000-218002 |
| Jul. 18, 2000 | (JP) | .......................... | 2000-218003 |
| Jul. 18, 2000 | (JP) | .......................... | 2000-218004 |

(51) Int. Cl.$^7$ ............................................. H04Q 7/20
(52) U.S. Cl. ............................. 455/456.1; 455/432.1; 455/414.2; 455/456.5; 455/456.6; 370/328; 342/357.08; 342/357.1
(58) Field of Search .................. 455/414.2, 456.2–457, 455/432.1, 436, 440, 550.1, 556.1, 557; 370/328, 370/331, 334; 342/357.06–357.1, 457

(56) References Cited

U.S. PATENT DOCUMENTS

| 5,293,645 A | * | 3/1994 | Sood ........................ 455/456.2 |
|---|---|---|---|
| 5,355,526 A | | 10/1994 | Berninger |

(Continued)

FOREIGN PATENT DOCUMENTS

| CA | 2235982 | * | 4/1998 | ............ H04Q 7/22 |
|---|---|---|---|---|

(Continued)

OTHER PUBLICATIONS

Martin Junius, et al.; New Method for Processing GSM Radio Measurement Data: Applications for Locating, Handover, and Network Management; Jun. 8, 1994; vol. 1.

*Primary Examiner*—Stephen D'Agosta
(74) *Attorney, Agent, or Firm*—Sughrue Mion, PLLC

(57) ABSTRACT

A mobile communication system including a plurality of base stations arranged in a communication area, each emitting a radio wave inherent thereto and a mobile station moving in the communication area and communicating with respective base stations via the transmitted radio waves. There is previously stored a location correlation data group including correlation data representing correlation situations of a plurality of arriving radio waves produced by the transmitted radio waves at respective ones of a plurality of sampling locations within the communication area, the location correlation data corresponding to respective locations. Upon reception of radio waves at a current location of the mobile station, current correlation data is calculated representing correlation situations among received arriving radio waves for the respective mobile station. The location correlation data in the location correlation data group is compared with the current correlation data, and the current position of the mobile stations is determined in accordance with a result of the comparison, generating the determined current position data.

19 Claims, 26 Drawing Sheets

U.S. PATENT DOCUMENTS

| | | | |
|---|---|---|---|
| 5,479,482 A | * 12/1995 | Grimes | 455/556.1 |
| 5,725,660 A | * 3/1998 | Hiraishi | 117/201 |
| 6,026,304 A | 2/2000 | Hilsenrath et al. | |
| 6,064,339 A | 5/2000 | Wax et al. | |
| 6,088,586 A | * 7/2000 | Haverty | 455/422.1 |
| 6,317,605 B1 | * 11/2001 | Sakuma | 455/457 |
| 6,381,464 B1 | * 4/2002 | Vannucci | 455/456.1 |
| 6,421,009 B2 | * 7/2002 | Suprunov | 342/465 |
| 6,462,706 B2 | * 10/2002 | Decker | 342/357.02 |
| 6,526,267 B1 | * 2/2003 | Jokimies et al. | 455/161.1 |

FOREIGN PATENT DOCUMENTS

| | | |
|---|---|---|
| EP | 0 892 278 A2 | 1/1999 |
| WO | WO 00/18148 A1 | 3/2000 |

* cited by examiner

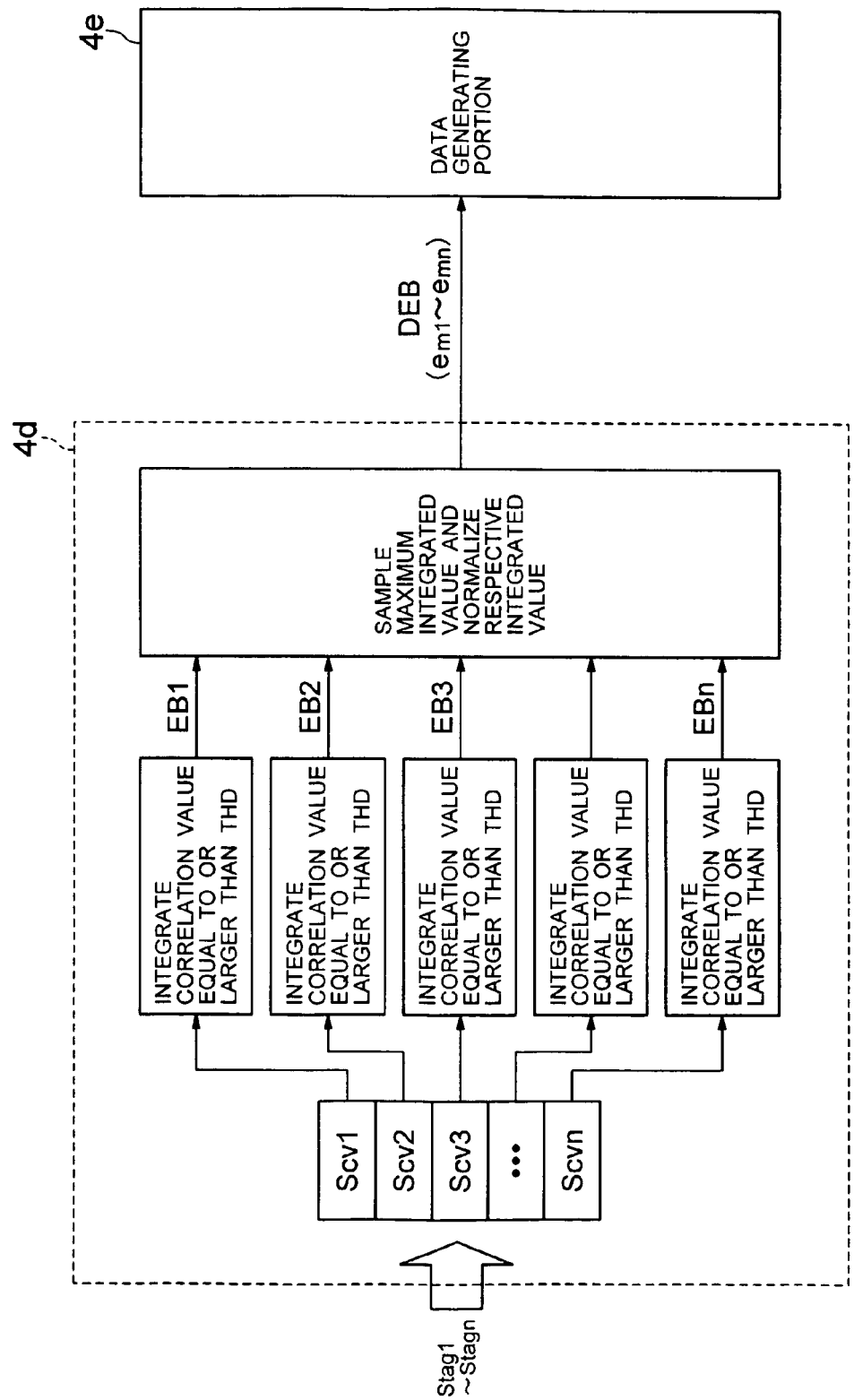

(DIAGRAM INDICATING STRUCTURE OF
LATITUDE AND LONGITUDE DATA BASE)

(DIAGRAM INDICATING STRUCTURE OF MULTIPATH DELAY TIME PERIOD)

(DIAGRAM INDICATING STRUCTURE OF MULTIPATH ELECTRIC FIELD INTENSITY DATA)

(DIAGRAM INDICATING STRUCTURE OF BASE STATION ELECTRIC FIELD INTENSITY DATA BASE)

FIG. 27

| | WHEN NEW REFERENCE DATA IS GENERATED BASED ON RECEIVED SITUATION DATA Dcnd AND STORED TO POSITION DATA STORING PORTION | WHEN REFERENCE DATA FOR UPDATING IS GENERATED BASED ON RECEIVED SITUATION DATA Dcnd AND OLD REFERENCE DATA IN POSITION DATA STORING PORTION IS UPDATED | WHEN RECEIVED SITUATION DATA Dcnd NOT INCLUDING LATITUDE AND LONGITUDE DATA DRxy IS TRANSMITTED |
|---|---|---|---|
| WHEN IDENTIFICATION CODE DATA Did IS FOR SPECIAL CONTRACTOR | FIRST KIND REGISTER DISCOUNT | | SECOND KIND REGISTER DISCOUNT |
| WHEN IDENTIFICATION CODE DATA Did IS FOR NON CONTRACTOR | COLLECT SYSTEM USE CHARGE (NORMAL CHARGE (NO DISCOUNT)) | | |

MOBILE COMMUNICATION SYSTEM WITH MOBILE STATION POSITION DETECTION

BACKGROUND OF THE INVENTION

1. Field of the Invention

The present invention relates to a mobile communication system, particularly to a mobile communication system having a function of detecting a position of a mobile station.

2. Description of the Related Art

With spread of a mobile communication system utilizing wireless communication, there has been desired development of a mobile communication system capable of detecting a current position of a mobile station changing every moment such as a portable telephone or a pager and dealing with a diversified communication environment of the mobile station while establishing a stable communication state based on information of detecting thereof.

As methods of detecting the current position of a mobile station, there have been known methods of detecting a position of a mobile station in a mobile communication system of a CDMA (Code Division Multiple Access) system disclosed in Japanese Patent Kokai No. 7-231473 and Japanese Patent Kokai No. 11-308658.

According to the former method of detecting a position of a mobile station, a mobile station detects respective reception electric field intensities of radio waves coming from a plurality of base stations and a position of the mobile station is predicted based on the detected reception electric field intensities.

According to the latter method of detecting a position of a mobile station, a mobile station detects respective reference signals transmitted from a plurality of base stations in synchronism with each other and predicts a position of the mobile station based on phase differences of the reference signals.

However, according to the method of detecting a position of a mobile station disclosed in Japanese Patent Kokai No. 7-231473, the distances from the mobile station to the respective base stations cannot be detected with high accuracy and therefore, there poses such problem that it is difficult to predict the position of the mobile station with high accuracy, when there is not a significant difference in respective distances from the mobile station to the plurality of base stations.

Further, according to the method of detecting a position of a mobile station disclosed in Japanese Patent Kokai No. 11-308658, there poses the problem that it is difficult to predict the position of the mobile station with high accuracy, when there are not direct waves from the plurality of base stations to the mobile station, the distances from the respective base stations cannot be detected with high accuracy.

OBJECT AND SUMMARY OF THE INVENTION

It is an object of the present invention to provide a mobile communication system overcoming the conventional problem mentioned above and capable of detecting a position of a mobile station with higher accuracy and dealing with a diversified mobile station communication environment.

According to an aspect of the present invention, there is provided a mobile communication system including a plurality of base stations positioned within a communication area each for emitting a radio waves inherent thereto and a mobile station moving within the communication area and communicating with the respectives of the base stations via the transmitted radio waves, the system comprising location correlation data group storing means for previously storing a location correlation data group including correlation datas respectively representing correlation situations of a plurality of arriving radio waves produced by the transmitted radio waves at respectives of a plurality of sampling locations within the communication area as location correlation datas respectively corresponding with the locations, current correlation data calculating means for receiving the arriving radio waves at a current position of the mobile station and calculating current correlation datas respectively representing the correlation situations among the arriving radio waves for the respective mobile stations, and current position determining means for comparing the location correlation data in the location correlation data group and the current correlation data and determining the current position of the mobile station in accordance with a result of the comparison thereby to generate information of the determined current position.

According to another aspect of the present invention, there is provided the mobile communication system wherein the current correlation data calculating means is mounted to the mobile station.

According to another aspect of the present invention, there is provided the mobile communication system further comprising displaying means for displaying the determined current location.

According to another aspect of the present invention, there is provided the mobile communication system wherein the displaying means is mounted to the mobile station.

According to another aspect of the present invention, there is provided the mobile communication system wherein the displaying means displays the determined current location on a map.

According to another aspect of the present invention, there is provided the mobile communication system further comprising determined current position transmitting and receiving means for transmitting and receiving information of the determined current position between the base station and the mobile station as well as identification information of the mobile station.

According to another aspect of the present invention, there is provided the mobile communication system further comprising location inherent data holding means for holding location inherent data inherent to the respectives of the sampling locations and location inherent data transmitting and receiving means for transmitting and receiving the location inherent data at one of the sampling locations equal to the determined current position, between the base station and the mobile station.

According to another aspect of the present invention, there is provided the mobile communication system wherein the correlation data representing the correlation situation is at least one of a multipath occurrence rate, a delay time period between the multipaths and an electric field intensity of each of the multipaths.

According to another aspect of the present invention, there is provided the mobile communication system wherein the electric field intensity is normalized on the basis of a maximum level of the multipaths at the current position while the maximum level is a reference for the normalization.

According to another aspect of the present invention, there is provided the mobile communication system wherein the sampling location belongs to any one of cell areas allocated the respective base stations.

According to another aspect of the present invention, there is provided the mobile communication system wherein the determining means determines the current position of the mobile station in accordance with the result of comparison of comparing the data at respective predetermined repetition periods.

According to another aspect of the present invention, there is provided the mobile communication system wherein the determining means performs the comparison by a degree of coincidence between the location correlation data and the current correlation data.

According to another aspect of the present invention, there is provided the mobile communication system wherein the determining means provides a plurality of the coincidence degrees in terms of the sampling locations as parameters and determining the current position by the sampling location in correspondence with a value having the highest coincidence degree among them.

According to another aspect of the present invention, there is provided the mobile communication system wherein the determining means provides a plurality of the coincidence degrees in terms of the sampling locations as parameters, provides a distribution state of coincidence degrees representing a distribution state in terms of the sampling locations and determines the current position to be a gravitational center position of the coincidence degree distribution state.

According to another aspect of the present invention, there is provided the mobile communication system wherein the determining means repeats its comparison operations at intervals and determines a comparison result at a preceding time as a comparison result at a current time when a moving speed of the mobile station is equal to or smaller than a predetermined speed.

According to another aspect of the present invention, there is provided the mobile communication system further comprising position measuring means mounted to the mobile station for generating an actually measured position data provided through its actual measurement of the current position of the mobile station, wherein the determining means reflects a content of the measured position data to the determined current position.

According to another aspect of the present invention, there is provided the mobile communication system further comprising measured position data transmitting and receiving means for transmitting and receiving the measured position data between the base station and the mobile station in accordance with only an operation instruction input.

According to another aspect of the present invention, there is provided the mobile communication system further comprising account means for carrying out a charge account processing for the respective mobile station in accordance with transmission and reception operation by the measured position data transmitting and receiving means.

According to another aspect of the present invention, there is provided the mobile communication system wherein the account means changes a charge account content in accordance with a number of times of operation of transmission and reception of the measured position datas of the respective mobile stations.

BRIEF DESCRIPTION OF THE DRAWINGS

FIG. 9 is a diagram schematically showing a structure of a base station electric field intensity measuring part according to the first embodiment;

FIG. 27 is a diagram showing modes of charge account processings.

DETAILED DESCRIPTION OF THE PREFERRED EMBODIMENTS

Embodiments of the present invention will be explained in reference to the drawings in the followings. A mobile communication system utilizing a wide band CDMA (W-CDMA) system which is a kind of an SS (Spread Spectrum) communication system will be explained as embodiments.

(First Embodiment)

Figure 1:
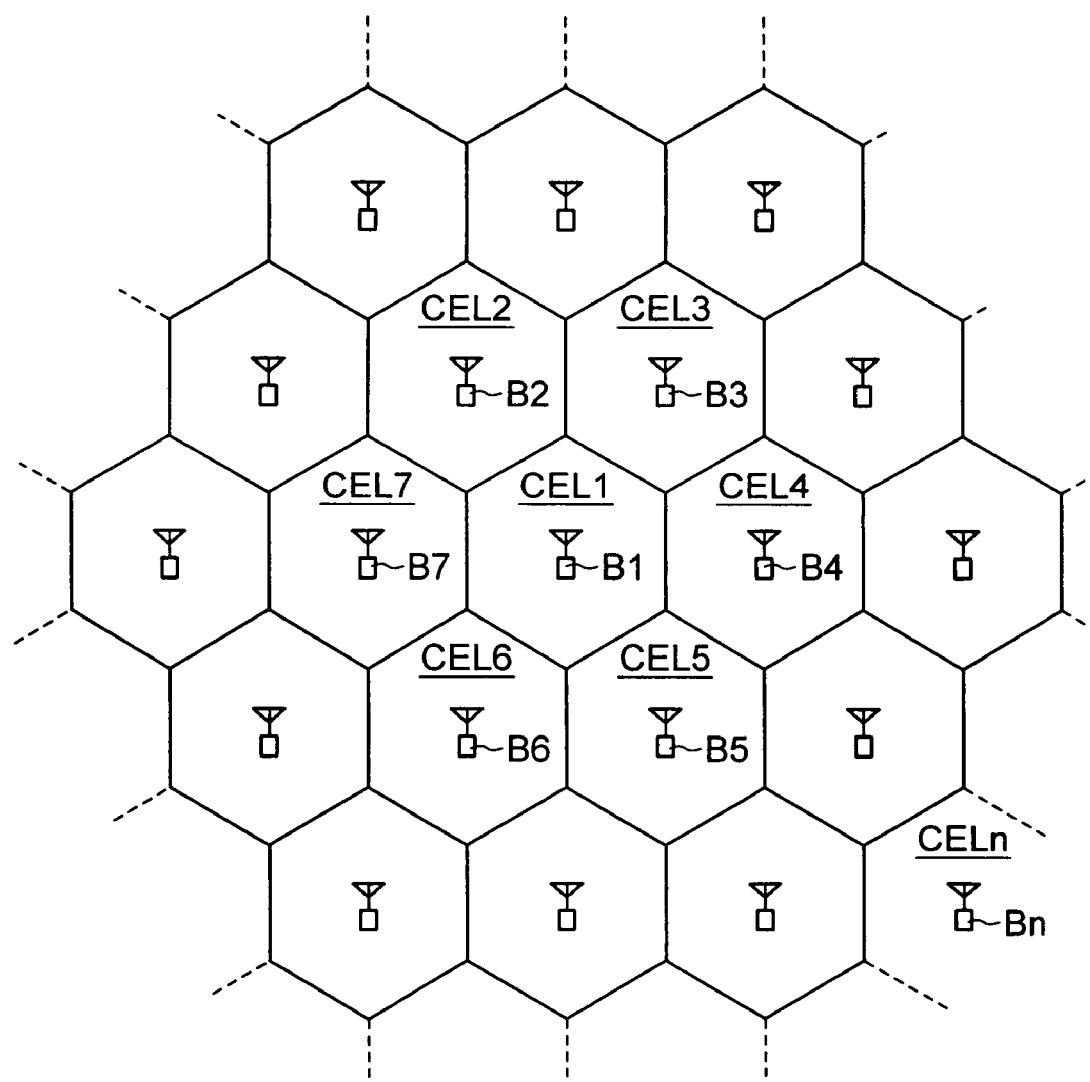
FIG. 1 is a view schematically showing a cell constitution of a communication area according to an exemplary embodiment of the present invention.

Reffering to FIGS. 1 through 16, the first embodiment of the present invention will be explained herein below:

FIG. 1 is a view schematically showing a total constitution of the mobile communication system utilizing the W-CDMA system, exemplifying distribution arrangement of hexagonal cells. It is to be noted that the shape of the cell is not limited to the hexagon.

According to the mobile communication system, a communication area is previously set to which is divided into an arbitrary number n of sections referred to as "cells". The respective cells CEL1 through CELn are installed with base stations B1 through Bn, the respective cells CEL1 through CELn are set to contain ranges where radio waves emitted from the respective base stations B1 through Bn reach. Further, the ranges where the radio waves reach are partly overlapped so as to avoid any uncommunicatable area.

When a mobile station such as a portable telephone moves along with a user in a cell, communication is carried out between the mobile station and a base station in the cell where the mobile station moves.

Figure 2:
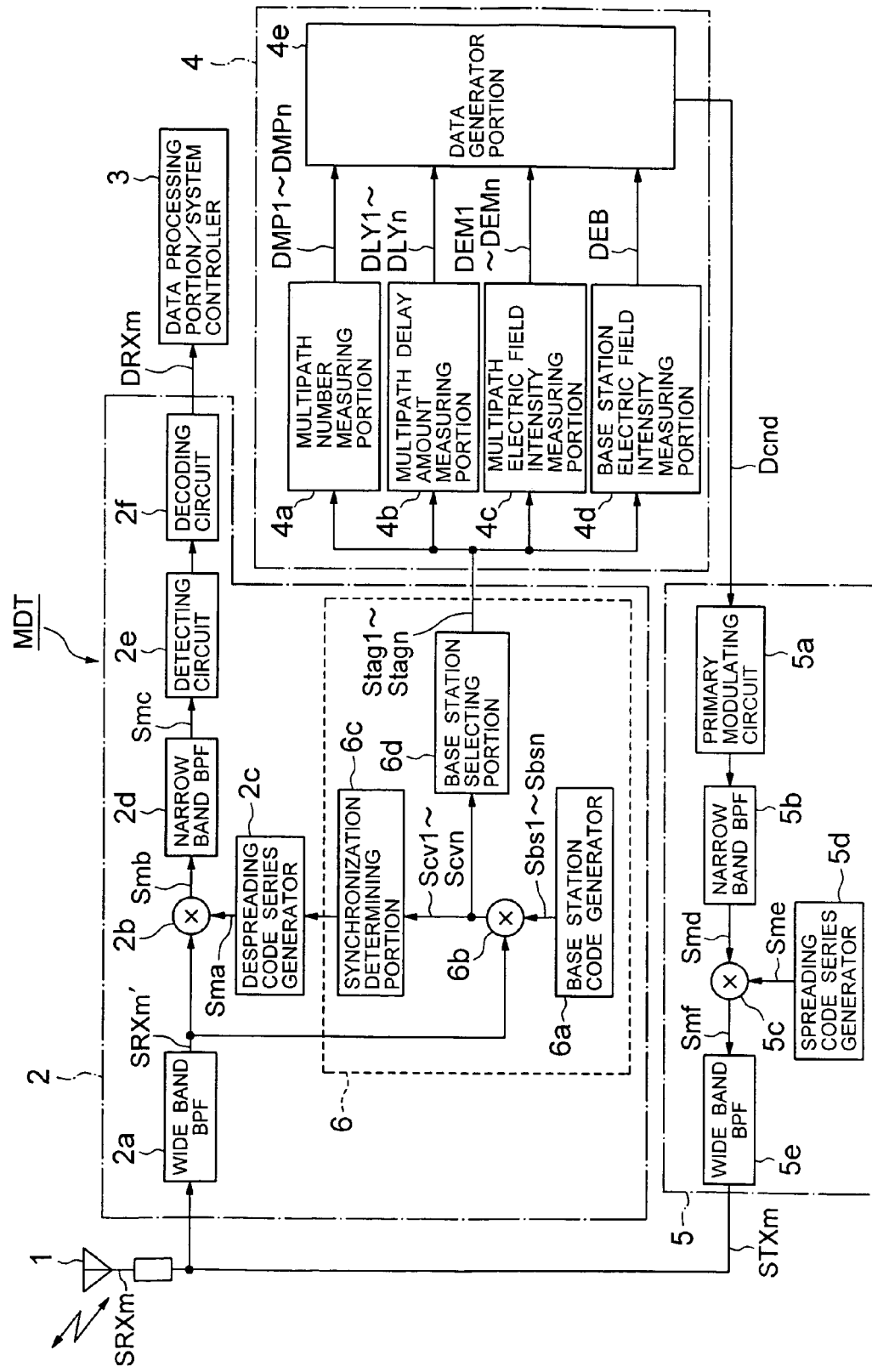
FIG. 2 is a block diagram showing a construction of a mobile station according to a first embodiment.
Figure 3:
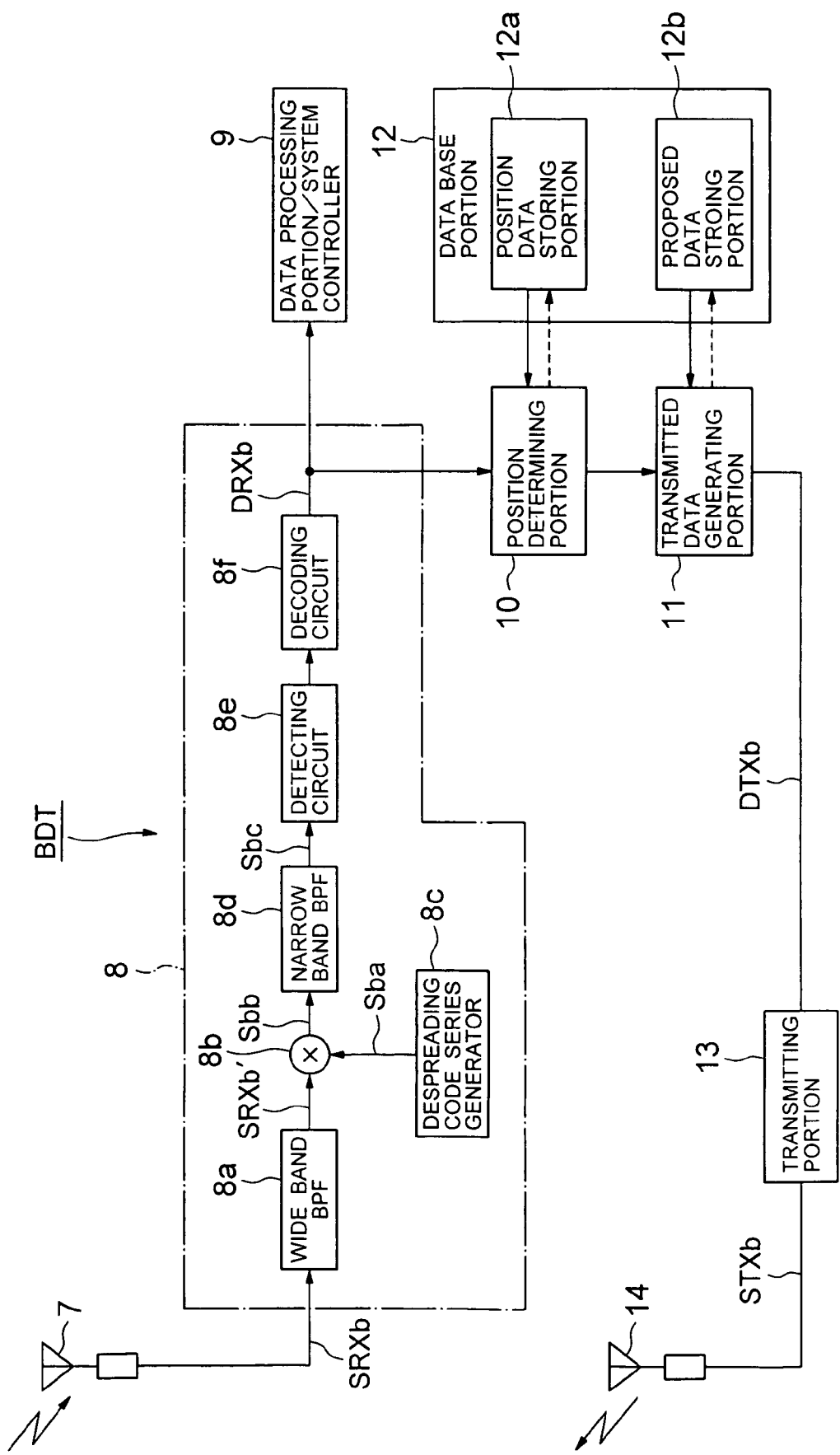
FIG. 3 is a block diagram showing a construction of a base station according to the first embodiment.

FIG. 2 is a block diagram showing a constitution of a mobile station MDT such as a portable telephone and FIG. 3 is a block diagram showing a constitution of a position detection processing part BDT provided to each of the base stations B1 through Bn.

In FIG. 2, the mobile station MDT comprises a receiving and transmitting antenna 1, a receiving portion 2, a data processing portion i.e. system controller 3, a position analyzing portion 4 and a transmitting portion 5.

The receiving and transmitting antenna 1 receives radio waves sent from the respective base stations B1 through Bn and emits a received signal SRXm to the receiving portion 2. Further, the receiving and transmission antenna 1 transmits a transmission signal STXm supplied from the transmitting portion 5 in the form of a transmission radio wave towards the respective base stations B1 through Bn.

The receiving portion 2 generates a received signal SRXm' excluding unnecessary frequency band signals by passing the received signal SRXm through a wide band pass filter 2a and multiplies (despreads) the received signal SRXm' by despreading code series Sma supplied from a despreading code series generator 2c at a despreading circuit 2b constituting a correlator. Further, the receiving portion 2 returns a despread signal Smb produced by the multiplication to a primary decoded signal Smc by passing the despread signal Smb through a narrow band pass filter 2d, reproduces a detected signal in a base band waveform by passing the primary decoded signal Smc through a detecting circuit 2e and decodes the detected signal by a decoding circuit 2f thereby to reproduce transmission data (received data) DRXm.

The data processing portion i.e. system controller 3 is provided with a microprocessor (MPU) for controlling operation of a total of the mobile station MDT and carrying out various data processings based on the received data DRXm.

Further, the receiving portion 2 is provided with a cell search portion 6 and the cell search portion 6 is provided with a base station code generator 6a, a despreading circuit 6b constituting a correlator, a synchronization determining portion 6c and a base station selecting portion 6d.

The base station code generator 6a consecutively generates despreading code series Sbs1 through Sbsn for determining radio waves coming from the respective base stations B1 through Bn.

The despreading circuit 6b outputs correlation signals Scv1 through Scvn by calculating respective correlations between the received signal SRXm' from the wide band pass filter 2a and the despreading code series Sbs1 through Sbsn.

That is, the despreading circuit 6b generates a correlation signal Scv1 by calculating a correlation between the received signal SRXm' and a despreading code series Sbs1, successively, generates a correlation signal Scv2 by calculating a correlation between the received signal SRXm' and a despreading code series Sbs2 and similarly repeats the correlation calculation until generating a correlation signal Scvn by calculating a correlation between the received signal SRXm' and a despreading code series Sbsn. Further, after finishing to generate an n number of the correlation signals Scv1 through Scvn, the despreading circuit 6b repeats the correlation calculation for generating an n number of the correlation signals Scv1 through Scvn again. Further, the correlation calculation is carried out while constituting a unit phase difference by a quarter duration Tc/4 of a chip duration Tc.

The synchronization determining portion 6c detects a correlation signal constituting a maximum correlation value from the correlation signals Scv1 through Scvn every time of generating an n number of the correlation signals Scv1 through Scvn, determines a base station (base station in correspondence with one of Sbs1 through Sbsn) in correspondence with the despreading code series when the detected correlation signal is generated and controls the despreading code series generator 2c to generate the despreading code series Sma for carrying out synchronized receiving between the mobile station MDT and the determined base station.

The base station selecting portion 6d generates correlation signals with identification codes Stag1 through Stagn related to the respective base stations B1 through Bn by attaching identification code data TAG1 through TAGn for the respective base stations B1 through Bn, to the correlation signals Scv1 through Scvn and supplies them to the position analyzing portion 4.

The position analyzing portion 4 is formed by an integrated circuit apparatus having an operational function such as a digital signal processor (DSP) and is provided with a multipath number measuring portion 4a, a multipath delay amount measuring portion 4b, a multipath electric field intensity measuring portion 4c, a base station electric field intensity measuring portion 4d and a data generating portion 4e.

(Multipath Number Measuring Portion 4a)

The multipath number measuring portion 4a measures multipath numbers MP1 through MPn of radio waves coming at the mobile station MDT from the respective base stations B1 through Bn based on the correlation signals with identification codes Stag1 through Stagn. That is, the multipath numbers MP1 through MPn are measured as follows.

Figure 4:
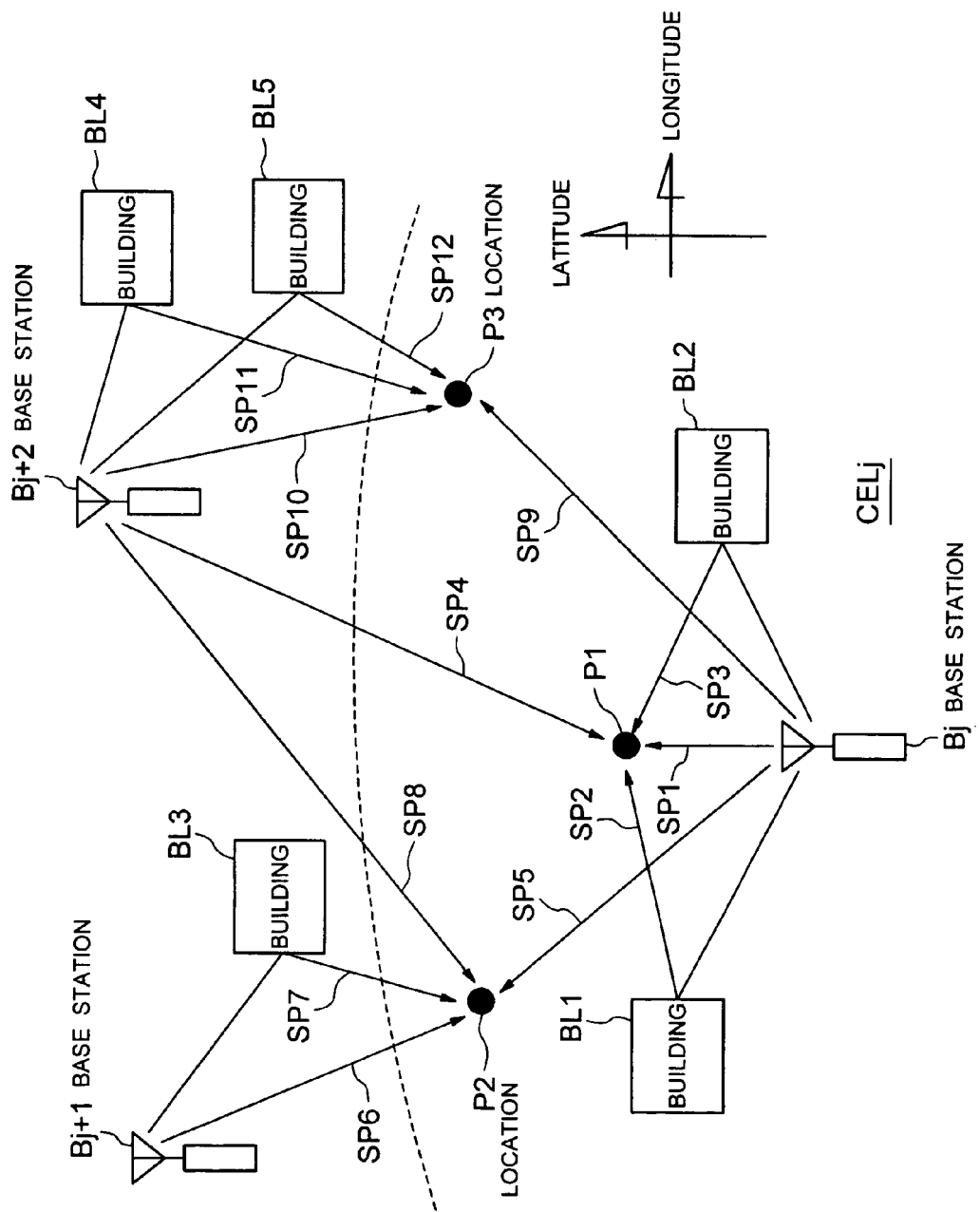
FIG. 4 is a view exemplifying modes of radio waves sent from respective base stations and arriving at a mobile station.
Figure 5:
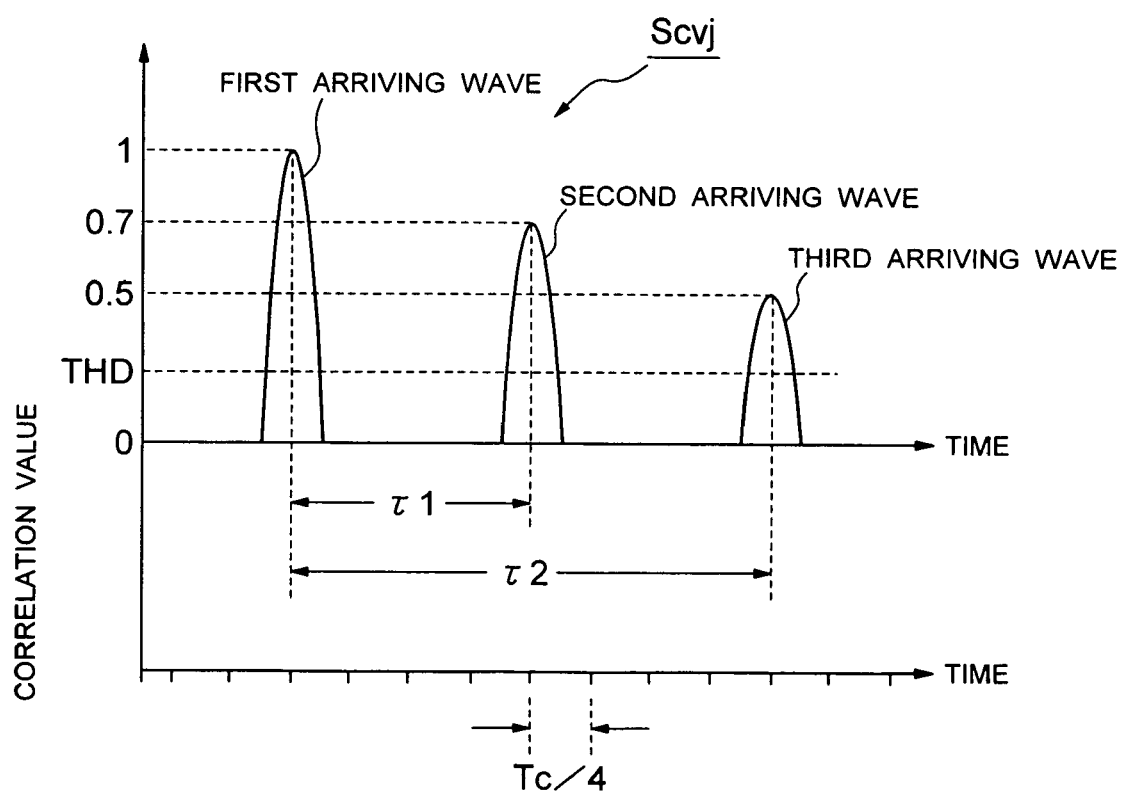
FIG. 5 is a diagram showing an example of correlation signals generated at a cell search part.

For example, as shown by FIG. 4, in the case in which the mobile station MDT is positioned at an arbitrary location P1 in a cell CELj of cells CEL1 through CELn, because of movement of a user, when radio waves SP1, SP2, SP3 and SP4 from base stations Bj and Bj+2 arrive at the mobile station MDT to thereby generate a correlation signal with an identification code Stagj having a correlation signal Scvj as shown by FIG. 5, with regard to a correlation value of the correlation signal Scvj, there is detected a peak larger than a threshold THD for removing unnecessary correlation values and a total number of detected peaks is defined as a multipath number MPj.

Further, in order to indicate that there has been measured the multipath number MPj on the basis of the correlation signal Scvj generated based on the despreading code series Sbsj for determining the base station Bj, the identification code data TAGj is added to the multipath number MPj and the multipath number data with the identification code DMPj (MPj, TAGj) is generated and supplied to the data generating portion 4e.

In this case, because of the wave SP1 coming directly from the base station Bj and the waves SP2 and SP3 coming therefrom after having been reflected by buildings BL1 and BL2 as shown by FIG. 4, there are generated the correlation signals Scvj as shown by FIG. 5 and a correlation value in correspondence with the wave SP4 coming from the base station Bj+2 exhibits a value smaller than the threshold THD. Therefore, the multipath number MPj provided by detecting the peaks is "3".

When, as shown in FIG. 4, the mobile station MDT is positioned at a location P2 in the cell CELj, when radio waves SP5, SP6, SP7 and SP8 from base stations Bj, Bj+1 and Bj+2 arrive at the mobile station MDT to thereby generate correlation signals Stagj having correlation signals Scvj with identification codes, peaks of the correlation signals Scvj are detected and a total number of the detected peaks is called a multipath number MPj. Further, in order to indicate that there is measured the multipath number MPj by the correlation signals Scvj generated based on the despreading code series Sbsj for determining the base station Bj, an identification code data TAGj is added to the multipath number MPj and multipath number data DMPj (MPj, TAGj) with identification code is generated and supplied to the data generating portion 4e.

In this case, the waves SP5, SP6 and SP8 directly coming from the base stations Bj, Bj+1 and Bj+2 and the reflected wave SP7 outputted from the base station Bj+1 and reflected by a building BL3, arrive at the mobile station MDT, in the correlation signals Scvj provided by the correlation calculation between the received signal SRXm' and the despreading code series Sbsj, only a correlation value in correspondence with the wave SP5 directly coming from the base station Bj is large and correlation values in correspondence with the waves SP6, SP7 and SP8 coming from the base stations Bj+1 and Bj+2 take values smaller than the threshold THD. Therefore, the multipath number MPj provided by detecting the peaks becomes "1".

When, as seen from FIG. 4, the mobile station is positioned at location P3 in the cell CELj, radio waves SP9, SP10, SP11 and SP12 from base stations Bj and Bj+2 arrive at the mobile station MDT to thereby generate correlation signals Stagj having correlation signals Scvj with identification codes, there are detected peaks of correlation values of the correlation signals Scvj and a total number of the detected peaks called a multipath number MPj. Further, in order to indicate that there is measured the multipath number MPj by the correlation signals Scvj generated based on the despreading code series Sbsj for determining the base station Bj, an identification code data TAGj is added to the multipath number MPj and multipath number data with identification code DMPj (MPj, TAGj) is generated and supplied to the data generating portion 4e.

In this case, the waves SP9 and SP10 directly coming from the base stations Bj and Bj+2 and reflected waves SP11 and SP12 outputted from the base station Bj+2 and reflected by buildings BL4 and BL5, arrive at the mobile station MDT, in the correlation signals Scvj provided by calculating correlation between received signals SRXm' and the despreading code series Sbsj, only a correlation value in correspondence with the wave SP9 directly coming from the base station Bj is large and correlation values in correspondence with the waves SP10, SP11 and SP12 coming from the base station Bj+2 become values smaller than the threshold THD. Therefore, the multipath number MPj provided by detecting the peaks becomes "1".

In this way, the multipath number measuring portion 4a calculates the multipath number MPj by detecting the peaks of the correlation signals Scvj generated based on the despreading code series Sbsj for determining the radio wave from the base station Bj and measures actual multipath number MPj when the mobile station MDT moves to an arbitrary position in the cell CELj. Further, by adding the identification code data TAGj indicating a correlation with the base station Bj to the multipath number MPj, the multipath number DMPj with the identification code is generated and supplied to the data generating portion 4e.

In this instance, it is to be noted that the suffix j indicates correspondences with the respective base stations B1 through Bn. Therefore, in accordance with supply of an n number of the correlation signals Stag1 through Stagn with identification codes from the base station selecting portion 6d, the multipath number measuring portion 4a measures the multipath numbers MP1 through MPn based on the correlation signals Scv1 through Scvn, generates an n number of the multipath number data with identification codes DMP1 (MP1, TAG1) through DMPn (MPn, TAGn) and supplies them to the data generating portion 4e.

Further, although an explanation has been given of a processing function of the multipath number measuring portion 4a by exemplifying the case in which the mobile station MDT moves in the cell CELj, even when the mobile station MDT is positioned in any cell range of the cells CEL1 through CELn, the multipath numbers MP1 through MPn are measured based on the correlation signals Scv1 through Scvn of the correlation signals Stag1 through Stagn with identification codes and an n number of the multipath number data with identification codes DMP1 (MP1, TAG1) through DMPn (MPn, TAGn) are generated and supplied to the data generating portion 4e.

Figure 6A:
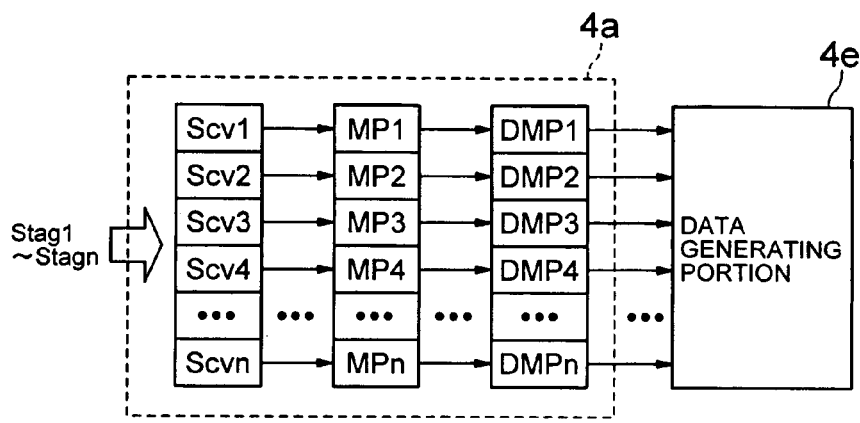
FIGS. 6A and 6B are diagrams schematically showing an arrangement and a modified example of a multipath number measuring part according to the first embodiment.

In this way, as schematically shown by FIG. 6A, the multipath number measuring portion 4a according to the embodiment consecutively measures the multipath numbers MP1 through MPn with all the correlation signals Scv1 through Scvn of the correlation signals Stag1 through Stagn having identification codes as objects of measurement.

Figure 6B:
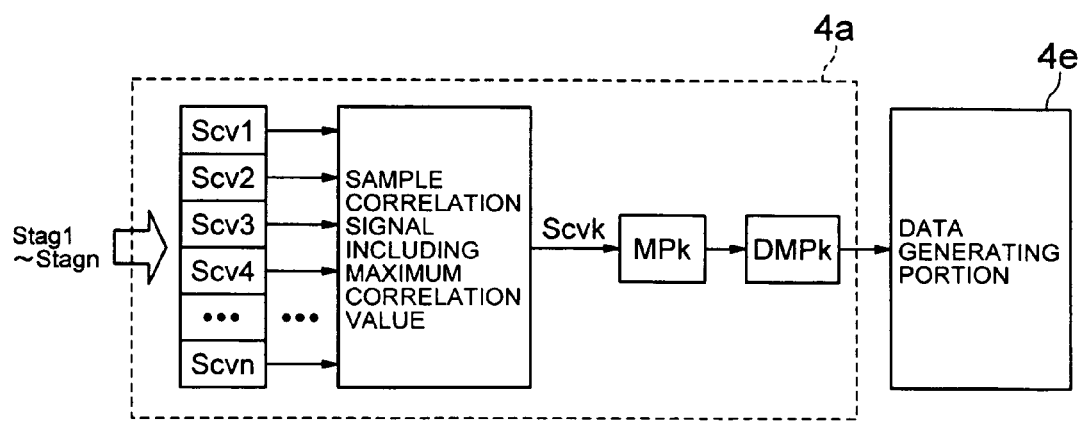

As shown by FIG. 6B, the multipath measuring portion 4a may be so constructed as to extract a single correlation signal Scvk satisfying a predetermined condition from an n number of correlation signals Scv1 through Scvn supplied thereto. Then a multipath number MPk is measured with the extracted correlation signal Scvk as an object of measurement, so as to produce a multipath number datas DMPk (MPk, TAGk) with an identification code and supply to the data generating portion 4e.

In this instance, it is to be understood that the correlation signals Scv1 through Scvn are obtained by calculating correlations between the despreading code series Sbs1 through Sbsn for determining the respective base stations B1 through Bn and the received signal SRXm'.

When, therefore, the mobile station MDT is positioned at an arbitrary location in a certain cell CELk, the correlation signal Scvk provided in correspondence with a radio wave originating from the base station Bk arranged in the cell CELk, takes a correlation value larger than those of other correlation signals (correlation signals Scv1 through Scvn except Scvk).

When, that is, the mobile station MDT is positioned at an arbitrary location in a certain cell CELk, the correlation signal Scvk generated by the correlation between the wave originating from the base station Bk and the despreading code series Sbsk, takes a signal most accurately indicating the multipath number and other correlation signal generated by correlations between radio waves coming from other base station other than the base station Bk and the spreading code series Sbs1 through Sbsn, are provided with probabilities of constituting correlation values to be smaller than the threshold THD and therefore, the other correlation signals are provided with not so much significance as objects of measuring the multipath numbers.

Hence, as shown by FIG. 6B, it is considerable to make an arrangement in which only the correlation signal Scvk representing the largest correlation value within the n number of the correlation signals Scv1 through Scvn, is extracted, the multipath number MPk is measured based on the extracted correlation signal Scvk, an identification code data TAGk indicating a relevancy with the base station Bk is attached to the measured multipath number MPk and multipath number datas DMPk (MPk, TAGk) with an identification code are generated and supplied to the data generating portion 4e.

According to this modified example, the multipath number MPk is calculated with only a wave coming from the base station Bk provided in the cell CELk where the mobile station MDT is placed as an object of measurement, the multipath number MPk is combined with the identification code data TAGk showing the relevancy with the base station Bk provided in the cell CELk where the mobile station MDT is positioned and supplied to the data generating portion 4e and therefore, a number of the supplied multipath number data with identification codes DMP1 through DMPn to the data generating portion 4e can be reduced.

Since such arrangement causes to exclude a radio waves coming from mobile stations in cells where the mobile station MDT does not actually exist and therefore, only particularly significant multipath number data with respective identification codes DMP1 through DMPn can be supplied to the data generating portion 4e.

Further, with regard to the constitution of the multipath number measuring portion 4a, it is possible to select either a constitution in which the multipath number datas DMP1 through DMPn with identification codes are supplied to the data generating portion 4e with all of the correlation signals Scv1 through Scvn as objects of measurement, or a constitution in which the multipath number datas DMP1 through DMPn with the identification codes are supplied to the data generating portion 4e with only the correlation signal satisfying the predetermined conditions as an object of measurement from the correlation signals Scv1 through Scvn as in the above modification, in view of desirable design or specifications.

(Multipath/Delay Amount Measuring Portion 4b)

The multipath delay amount measuring portion 4b measures propagation delay time periods LY1 through LYn of respective radio waves coming from the respective base stations B1 through Bn based on the correlation signals Stag1 through Stagn with identification codes. That is, the respective propagation delay time periods LY1 through LYn are measured as follows.

When, for example, the mobile station MDT is positioned at an arbitrary location P1 a cell CELj because of movement of a user as shown by FIG. 4, a wave SP1 directly coming from the base station Bj and waves SP2 and SP3 coming from the same base but having been reflected by buildings BL1 and BL2, the correlation signals Scvj are generated as seen frm FIG. 5, only correlation values of correlation signals Scvj are detected having peak values larger than the predetermined threshold THD for removing noise components. Then, the maximum peak value is made as a reference and there are measured phase differences $\tau1$ and $\tau2$ with respect to the peaks of the remaining peak values and the phase differences $\tau1$ and $\tau2$ are defined as propagation delay time periods LYj ($\tau1$, $\tau2$).

In this instance, it is to be understood that a correlation value in correspondence with the wave SP4 coming from the base station Bj+2 shown in FIG. 4 takes a value smaller than the threshold THD and therefore, only peaks of correlation values in correspondence with the waves SP1, SP2 and SP3 coming from the base station Bj, appear as the correlation signals Scvj and two phase differences $\tau1$ and $\tau2$ are calculated.

In order to indicate that there are calculated the propagation delay time periods LYj by means of the correlation signals Scvj generated based on the despreading code series Sbsj for determining the base station Bj, identification code datas TAGj are added to the propagated delay time periods LYj, so that delay time period datas DLYj (LYj, TAGj) with identification codes are formed and supplied to the data generating portion 4e.

When the mobile station MDT is moved to the location P2 in the cell CELj shown in FIG. 4 and the waves SP5, SP6 and SP8 directly coming from the base stations Bj, Bj+1 and Bj+2 and the reflected wave SP7 issued from the base station Bj+1 and reflected by the building BL3, arrive at the mobile station MDT, there are detected peaks of correlation values of correlation signals Scvj provided by calculating correlations between the received signals SRXm' and the despreading code series Sbsj, with a maximum correlation value as a reference, there are measured phase difference to peaks of remaining correlation values and the measured phase differences are defined as propagation delay time periods LYj. Further, by adding identification code data TAGj to the propagation delay time periods LYj, delay time period datas DLYj (LYj, TAGj) with identification codes are formed and supplied to the data generating portion 4e.

In this case, only a correlation value in correspondence with the wave SP5 directly coming from the base station Bj appears, correlation values in correspondence with the waves SP6, SP7 and SP8 coming from the base stations B2 and B3 take values smaller than the threshold THD and therefore, only a single peak of the correlation value appears and the phase difference (delay time period LYj) becomes "0".

When the mobile station MDT is moved to the location P3 in the cell CELj shown by FIG. 4 and the waves SP9 and SP10 directly coming from the base stations Bj and Bj+2 and the reflected waves SP11 and SP12 issued from the base station Bj+2 and reflected by the buildings BL4 and BL5, arrive at the mobile station MDT, there are detected peaks of correlation values of correlation signals Scvj provided by calculating correlations between the received signals SRXm' and the despreading code series Sbsj, with a maximum correlation value as a reference, there are measured phase differences to peaks of remaining correlation values and the measured phase differences are defined as propagation delay time periods LYj. Further, by adding identification code data TAGj to the propagation delay time periods LYj, delay time period datas DLYj (LYj, TAGj) with identification codes are formed and supplied to the data generating portion 4e.

In this case, in the correlation signals Scvj provided by calculating the correlations between the received signals SRXm' and the despreading code series Sbsj, only a single correlation value in correspondence with the wave SP9 directly coming from the base station Bj appears and correlation values in correspondence with the waves SP10, SP11 and SP12 coming from the base station Bj+2, take values smaller than the threshold THD. Therefore, the phase difference (delay time period LYj) becomes "0".

In this way, the multipath delay amount measuring portion 4b detects peaks of correlation signals Scvj generated based on the despreading code series Sbsj for determining radio waves from the base station Bj and measures the propagation delay time periods LYj for respective multipaths of radio waves coming from the base station Bj based on phase differences between one peak and other peaks of the detected correlation values. Further, with a maximum correlation value for detecting peak as a reference, phase differences to peaks of remaining correlation values are measured and therefore, when there are detected Q of peaks of correlation values, there are calculated propagation delay time periods LYj of (Q−1) of multipaths.

In this instance, it is to be understood that the suffix j of the propagation delay time period LYj indicates correspondences with the respective base stations B1 through Bn. Therefore, the multipath delay amount measuring portion 4b measures propagation delay time periods LY1 through LYn of multipaths based on the correlation signals Scv1 through Scvn in accordance with supply of an n number of correlation signals with identification codes Stag1 through Stagn from the base station selecting portion 6d, generates an n number of propagation delay time period datas DLY1 (LY1, TAG1) through DLYn (LYn, TAGn) with identification codes and supplies them to the data generating portion 4e.

Although an explanation has been given of a processing function of the multipath delay amount measuring portion 4b in the above with respect to the case in which the mobile station MDT moves within the cell CELj, it is possible to measure propagation delay time periods LY1 through LYn for respective multipaths, based on the correlation signals Scv1 through Scvn with identification codes Stag1 through Stagn even when the mobile station MDT is positioned in any cell range of the cells CEL1 through CELn and an n number of propagation delay time period datas DLY1 (LY1, TAG1) through DLYn (LYn, TAGn) with identification codes are generated and supplied to the data generating portion 4e.

Figure 7A:
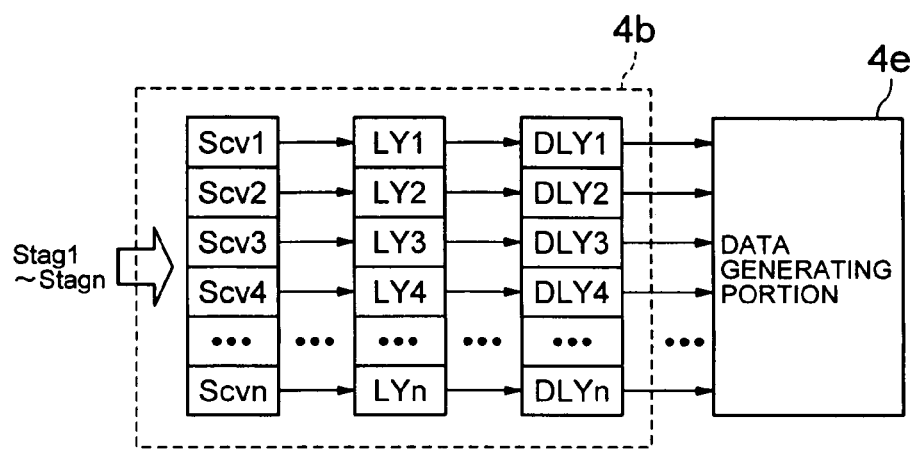
FIGS. 7A and 7B are diagrams schematically showing an arrangement and a modified example of a multipath delay amount measuring part according to the first embodiment.

In this way, as is schematically shown in FIG. 7A, the multipath delay amount measuring portion 4b according to the embodiment consecutively measures the delay time periods LY1 through LYn of multipaths with all the correlation signals Scv1 through Scvn with identification codes Stag1 through Stagn as objects of measurement.

Figure 7B:
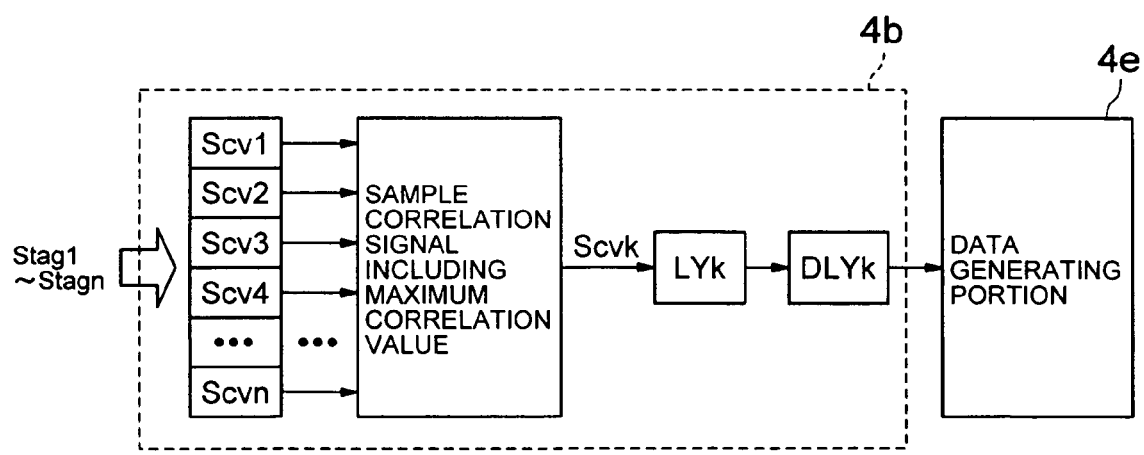

Further, as a modified example of the multipath delay amount measuring portion 4b, as shown by FIG. 7B, there may be constructed a constitution in which there is extracted a single correlation signal Scvk satisfying a predetermined condition from the n number of correlation signals Scv1 through Scvn supplied thereto, a propagation delay time period LYk of multipaths is measured with respect to the extracted correlation signal Scvk as an object of measurement, delay time period datas DLYk (LYk, TAGk) with an identification code are generated and supplied to the data generating portion 4e.

Meanwhile, the correlation signals Scv1 through Scvn are calculated by calculating correlations between the despreading code series Sbs1 through Sbsn and the received signals SRXm' for determining the respective base stations B1 through Bn.

When, therefore, the mobile station MDT is positioned at an arbitrary location in a certain cell CELk, the correlation signal Scvk provided in correspondence with a radio wave coming from the base station Bk arranged in the cell CELk, takes a correlation value larger than other correlation signals (correlation signals Scv1 through Scvn except Scvk). That is, the correlation signal Scvk takes a signal indicating multipaths most accurately and other correlation signals are not so much significant as objects of measurement.

Hence, such an arrangement as shown by FIG. 7B may be provided wherein there is extracted only the correlation signals Scvk including the largest correlation value from an n number of the correlation signals Svc1 through Scvn, and there is measured the propagation delay time period LYk of multipaths based on the extracted correlation signal Scvk, identification code data TAGk indicating a relevancy with the base station Bk is added to the measured propagation delay time period LYk and a propagation delay time period DLYk (LYk, TAGk) with identification code is generated and supplied to the data generating portion 4e.

According to the modified example, when the mobile station MDT is positioned at an arbitrary location in CEL1, the propagation delay time period LY1 of multipaths of a radio wave coming from the base station B1 is supplied to the data generating portion 4e. when the mobile station MDT is positioned at an arbitrary location in CEL2, the propagation delay time period LY2 of multipaths of a radio wave coming from the base station B2 is supplied to the data generating portion 4e. Similarly, when the mobile station MDT is positioned at an arbitrary location in CELn, the propagation delay time period LYn of multipaths of a radio wave coming from the base station Bn is supplied to the data generating portion 4e and therefore, the number of propagation delay time period data with identification codes supplied to the data generating portion 4e can be reduced.

Further, a radio wave coming from a mobile station in a cell where the mobile station MDT is not actually positioned, is excluded and therefore, only particularly significant propagation delay time period data DLY1 through DLYn with respective identification codes can be supplied to the data generating portion 4e.

In this instance, it is to be understood that the multipath delay amount measuring portion 4b may be pertinently arranged to take either such constitution that the propagation delay time datas DLY1 through DLYn with identification codes are supplied to the data generating portion 4e with all the correlation signals Scv1 through Scvn as objects of measurement, or such constitution that as in the modified example, the propagation delay time period datas DLY1 through DLYn with identification codes are supplied to the data generating portion 4e with only the correlation signal satisfying the predetermined condition as an object of measurement from the correlation signals Scv1 through Scvn in view of desirable design or specifications.

(Multipath Electric Field Intensity Measuring Portion 4c)

The multipath electric field intensity measuring portion 4c measures electric field intensities EM1 through EMn for respective multipaths of radio waves coming from the respective base stations B1 through Bn based on the correlation signals Stag1 through Stagn with identification codes.

That is, the respective electric field intensities EM1 through EMn are measured as follows.

When, for example, the mobile station MDT reaches the arbitrary location P1 in cell CELj because of movement of the user, there are formed the correlation signals Scvj as shown by FIG. 5 in accordance with the wave SP1 directly coming from the base station Bj and the reflected waves SP2 and SP3 arriving thereat after having been reflected by the buildings BL1 and BL2, with regard to correlation values of the correlation signals Scvj, there are detected peaks having correlation values larger than the predetermined threshold THD in order to remove noise components.

Then, peaks of the remaining correlation values are normalized on the basis of a maximum correlation value the peak which is detected as a reference value "1" and the normalized correlation values (peak values) are defined as electric field intensities for respective multipaths.

It is to be understood that the correlation value in correspondence with the wave SP4 coming from the base station Bj+2 shown in FIG. 4 becomes a value smaller than the threshold THD and therefore, only peaks of the correlation values in correspondence with the waves SP1, SP2 and SP3 coming from the base station Bj, appear in the correlation signals Scvj. Further, by normalizing the peaks with the maximum correlation value generated in correspondence with the wave SP1 coming therefrom as the reference value "1", the correlation values in correspondence with the remaining radio waves SP2 and SP3 are made to constitute relative values such as "0.7", "0.5" and three of the normalized correlation values "1", "0.7" and "0.5" are made to constitute the electric field intensities EMj (1, 0.7, 0.5) of respective multipaths.

Further, in order to indicate that there are calculated the electric field intensities for the multipaths by the correlation signals Scvj generated based on the despreading code series Sbsj for determining the base station Bj, the identification code datas TAGj are added to the electric field intensities EMj, multipath electric field intensity datas DEMj (EMj, TAGj) with identification codes are generated and supplied to the data generating portion 4e.

When the mobile station MDT is positioned at other location P1 or P2 in the cell CELj as shown by FIG. 4, the normalized electric field intensities of respective multipaths are calculated and identification code data TAGj are added to the calculated electric field intensities EMj, so that multipath electric field intensity datas DEMj (EMj, TAGj) with identification codes are generated and supplied to the data generating portion 4e.

In this way, the multipath electric field intensity measuring portion 4c detects the peak of the correlation signal Scvj generated based on the despreading code series Sbsj for determining the radio wave from the base station Bj and measures the normalized value of the detected correlation value as the electric field intensity of each of the multipaths.

The suffix j of the electric field intensity EMj indicates correspondences with either one of the base stations B1 through Bn. Therefore, the multipath electric field intensity measuring portion 4c measures the electric field intensities EM1 through EMn of the respective multipaths based on the correlation signals Scv1 through Scvn in accordance with supply of an n number of the correlation signals with identification codes Stag1 through Stagn from the base station selecting portion 6d and supplies them to the data generating portion 4e in the form of an n number of the multipath electric field intensity data DEM1 (EM1, TAG1) through DEMn (EMn, TAGn) with identification codes.

Although an explanation has been given of the processing function of the multipath electric field intensity measuring portion 4c by exemplifying the case in which the mobile station MDT is moved in the cell CELj, even when the mobile station MDT is positioned within any cell range of the cells CEL1 through CELn, the electric field intensities EM1 through EMn are measured based on the correlation signals Scv1 through Scvn of the correlation signals with identification codes Stag1 through Stagn and supplied to the data generating portion 4e in the form of an n number of the multipath electric field intensity datas DEM1 (EM1, TAG1) through DEMn (EMn, TAGn) with identification codes.

Figure 8A:
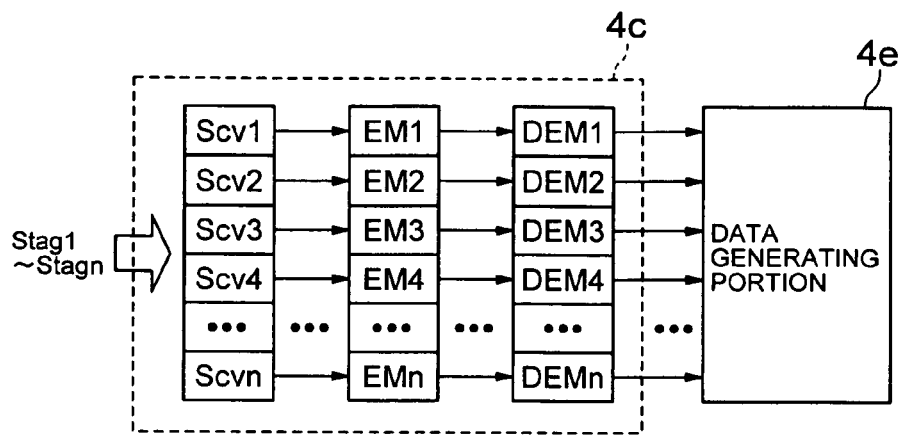
FIGS. 8A and 8B are diagrams schematically showing a constitution and a modified example of a multipath electric field intensity measuring part according to the first embodiment.

In this way, as schematically shown by FIG. 8A, the multipath electric field intensity measuring portion 4c according to the embodiment consecutively measures the electric field intensities EM1 through EMn of the respective multipaths with all the correlation signals Scv1 through Scvn with identification codes Stag1 through Stagn as objects of measurement.

Figure 8B:
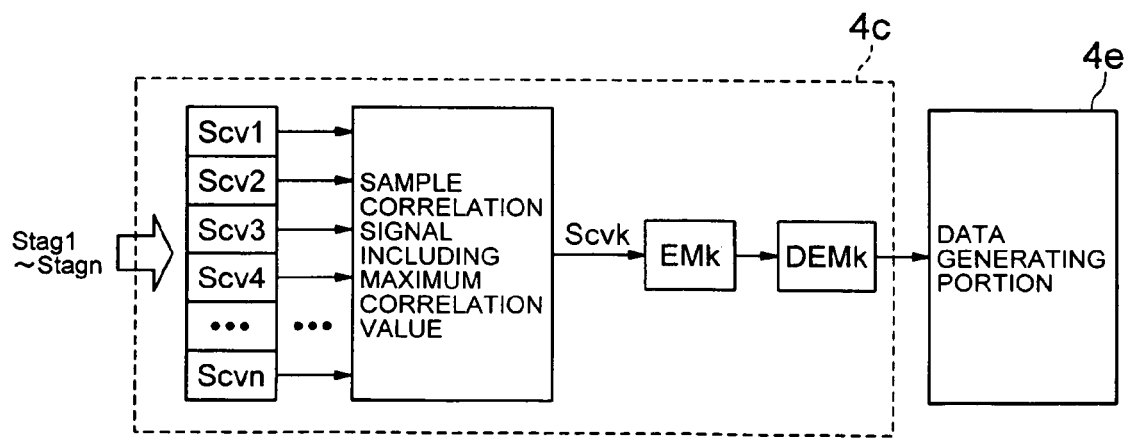

In this case, as a modified example of the multipath electric field intensity measuring portion 4c, as shown by FIG. 8B, there may be made an arrangement in which there is extracted a single correlation signal Scvk satisfying a predetermined condition from the n number of correlation signals Scv1 through Scvn supplied, there is measured the electric field intensity EMk for respective multipaths with the extracted correlation signal Scvk as an object of measurement and the multipath electric field intensity data DEMk (EMk, TAGk) with an identification code are generated and supplied to the data generating portion 4e.

That is, the correlation signals Scv1 through Scvn are calculated by calculating correlations between the despreading code series Sbs1 through Sbsn and the received signal SRXm' for determining the respective base stations B1 through Bn.

When, therefore, when the mobile station MDT is positioned at an arbitrary location in a certain cell CELk, the correlation signal Scvk provided in correspondence with a radio wave coming from the base station Bk arranged in the cell CELk, includes a correlation value larger than those of other correlation signals (correlation signals of Scv1 through Scvn except Scvk).

That is, the correlation signal Scvk becomes a signal indicating the electric field intensity of multipaths most accurately and other correlation signals are not so much significant as objects for measuring the electric field intensities of the multipaths.

Hence, as shown by FIG. 8B, there may be made such an arrangement in which the correlation signal Scvk including the largest correlation value within an n number of the correlation signals Scv1 through Scvn is extracted, based on the extracted correlation signal Scvk, there is measured the electric field intensity EMk of the respective multipaths of the wave coming from the base station Bk and the multipath electric field intensity data DEMk (EMk, TAGk) with an identification code added with the identification code data TAGk indicating the relevancy with the base station Bk, is generated and supplied to the data generating portion 4e.

According to the modified example, the number of the multipath electric field intensity datas DEM1 through DEMn with identification codes supplied to the data generating portion 4e can be reduced. Further, a radio wave coming from a movable station in a cell where the mobile station MDT is not actually positioned, is excluded and therefore, only particularly significant multipath electric field intensity datas DEM1 through DEMn with respective identification codes, can be supplied to the data generating portion 4e.

Further, with regard to the constitution of the multipath electric field intensity measuring portion 4c, there can be pertinently selected either such constitution in which the multipath electric field intensity datas DEM1 through DEMn with identification codes are supplied to the data generating portion 4e with all the correlation signals Scv1 through Scvn as objects of measurement, or such constitution in which the multipath electric field intensity datas DEM1 through DEMn with identification codes are supplied to the data generating portion 4e with only the correlation signal satisfying the predetermined condition as an object of measurement from the correlation signals Scv1 through Scvn as in the modified example, in view of desired design or specifications.

(Base Station Electric Field Intensity Measuring Portion 4d)

The base station electric field intensity measuring portion 4d measures electric field intensities EB1 through EBn of the respective base stations of radio waves coming from the respective base stations B1 through Bn based on the correlation signals Stag1 through Stagn with identification codes, defines base station electric field intensities em1 through emn by values produced by normalizing the electric field intensities EB1 through EBn and supplies them to the data generating portion 4e in the form of base station electric field intensity datas DEB (Em1 through emn) summarizing the base station electric field intensities em1 through emn.

That is, as is schematically shown by FIG. 9, an n number of the correlation signals Scv1 through Scvn supplied from the base station selecting portion 6d, are respectively compared with the threshold THD and correlation values having values larger than the threshold THD are extracted and integrated for the respective correlation signals Scv1 through Scvn. Further, the provided respective integrated values define the electric field intensities EB1 through EBn of radio waves coming from the respective base stations B1 through Bn.

Further, there are calculated the base station electric field intensities em1 through emn indicating ratios of the electric field intensities of the radio waves coming from the respective base stations B1 through Bn by extracting the largest value from the electric field intensities EB1 through EBn (that is, maximum integrated value) and normalizing the remaining integrated values based on the extracted maximum integrated value as "1". Further, the base station electric field intensity datas DEB (em1 through emn) are generated by summarizing the base station electric field intensities em1 through emn and supplied to the data generating portion 4e.

When, for example, the mobile station MDT is positioned at an arbitrary location P1 in a certain cell CELj by being accompanied by movement of a user as shown in FIG. 4, the radio wave SP1 from the base station Bj and the reflected waves SP2 and SP3 reflected by the buildings BL1 and BL2, arrive thereat, to the base station electric field intensity measuring portion 4d, supplied an n number of the correlation signals Scv1 through Scvn produced by correlations between the received signals SRXm' including the radio waves SP1, SP2 and SP3 and the despreading code series Sbs1 through Sbsn.

In this case, the correlation value in correspondence with the wave SP4 coming from the base station Bj+2 shown in FIG. 4, becomes a value smaller than the threshold THD and therefore, similar to those shown in FIG. 5, the correlation values in correspondence with the waves SP1, SP2 and SP3 coming from the base station Bj, appear in the correlation signals Scvj. Therefore, the base station electric field intensity measuring portion 4d integrates correlation values larger than the threshold THD as mentioned above, thereby, a total electric field intensity (base station electric field intensity) EBj of the waves SP1, SP2 and SP3 coming from the base station Bj, becomes the largest value and a base station electric field intensity of a radio wave coming from other base station other than the base station Bj, becomes an extremely small value.

Therefore, the base station electric field intensity data DEB (em1 through emn) indicates that the mobile station MDT is placed in the cell CELj receiving the waves coming from the base station Bj the most strongly.

Further, although an explanation has been given of the processing function of the base station electric field intensity measuring portion 4d by exemplifying the case in which the mobile station MDT is moved in the cell CELj, even when the mobile station MDT is positioned in any cell range of CEL1 through CELn, based on the correlation signals Scv1 through Scvn of the correlation signals Stag1 through Stagn with identification codes, there are measured the base station electric field intensities EB1 through EBn for the respective base stations B1 through Bn and the base station electric field intensity data DEB (em1 through emn) are generated and supplied to the data generating portion 4e. Therefore, in the base station electric field intensity datas DEB (em1 through emn), there appears the electric field intensity of the radio wave coming from the base station in the cell where the mobile station MDT is actually positioned, as the largest value.

(Data Generating Portion 4e)

The data generating portion 4e summarizes the multipath number data DMP1 (MP1, TAG1) through DMPn (MPn, TAGn) with identification codes supplied from the multipath number measuring portion 4a, the propagation delay time period data with identification codes DLY1 (LY1, TAG1) through DLYn (LYn, TAGn) supplied from the multipath delay amount measuring portion 4b, the multipath electric field intensity data DEM1 (EM1, TAG1) through DEMn (EMn, TAGn) with identification codes supplied from the multipath electric field intensity measuring portion 4c, and the base station electric field intensity datas DEB (em1 through emn) supplied from the base station electric field intensity measuring portion 4d, adds an identification code data (telephone number) Did of the mobile station MDT thereto, and thereby forms received situation data Dcnd (DMP1 through DMPn, DLY1 through DLYn, DEM1 through DEMn, DEB, Did) and supplies thereof to the transmitting portion 5.

When the reception situation data Dcnd is supplied to the transmitting portion 5, the transmitting portion 5 generates a primary modulated signal Smd by subjecting the reception situation data Dcnd to narrow band modulation by a primary modulating circuit 5a and passing it through a narrow band pass filter 5b and multiplies (spreads) the primary modulated signal Smd by a diverging code series Sme from a spreading code series generator 5d by a spreading circuit 5c constituting a correlator. Further, the transmitting portion 5 generates the transmitted signal STXm by passing a divergion signal Smf produced by the multiplication through a wide band pass filter 5e and transmits it towards the base station via the receiving/transmitting antenna 1.

In this way, at the current position in the communication area, the mobile station MDT calculates the characteristics of the situation of receiving the radio waves coming from the base stations B1 through Bn as the multipath number data DMP1 through DMPn, the propagation delay time period data DLY1 through DLYn, the multipath electric field intensity data DEM1 through DEMn and the base station electric field intensity data DEB and transmits the data toward the base station in the form of the reception situation data Dcnd (DMP1 through DMPn, DLY1 through DLYn, DEM1 through DEMn, DEB, Did).

Next, an explanation will be given of a constitution of the position detection processing portion BDT provided to the respective base stations B1 through Bn in reference to FIG. 3.

The position detection processing portion BDT comprises a receiving antenna 7 for receiving radio waves from the mobile station MDT, a receiving portion 8, a data processing portion i.e. system controller 9, a position determining portion 10, a transmitted data generating portion 11, a data base portion 12, a transmitting portion 13 and a transmitting antenna 14.

The receiving portion 8 generates a reception signal SRXb' excluding unnecessary frequency band components by passing the received signal SRXb supplied from the receiving antenna 7 through a wide band pass filter $8a$ and multiplies (despreads) the reception signal SRXb1 by a despreading code series Sba emitted from a despreading code series generator $8c$ by a despreading circuit $8b$ constituting a correlator. Further, a despread signal Sbb produced by the multiplication is returned to a primary modulated signal Sbc by passing it through a narrow band pass filter $8d$, the primary modulated signal Sbc is passed through a detecting circuit $8e$ thereby to reproduce a detected signal in a base band waveform and the detected signal is decoded by a decoding circuit $8f$ thereby to reproduce data DRXb transmitted from the mobile station MDT. That is, the data DRXb is reproduced from the received situation data Dcnd (DMP1 through DMPn, DLY1 through DLYn, DEM1 through DEMn, DEB, Did) transmitted from the mobile station MDT.

The data processing portion i.e. system controller 9, which is provided with a microprocessor (MPU), controls operation of overall operations of the position detection processing portion BDT and carries out various data processings based on the reproduced received situation datas Dcnd (DMP1 through DMPn, DLY1 through DLYn, DEM1 through DEMn, DEB, Did).

The data base portion 12 comprises a position data storing portion $12a$ and supplemental data storing portion $12b$.

In this instance, it is to be understood that the position data storing portion $12a$ stores respective datas of multipath number, multipath propagation delay time period, the multipath electric field intensity and base station electric field intensity actually measured by actually moving the mobile station MDT to various locations in the respective cells CEL1 through CELn by an enterprise of the mobile communication system, data representing the latitude and the longitude of the respective actually measured location (hereinafter, referred to as "latitude and longitude data DRxy") in the form of data bases as reference data as shown by FIG. 11 through FIG. 15.

Figure 10:
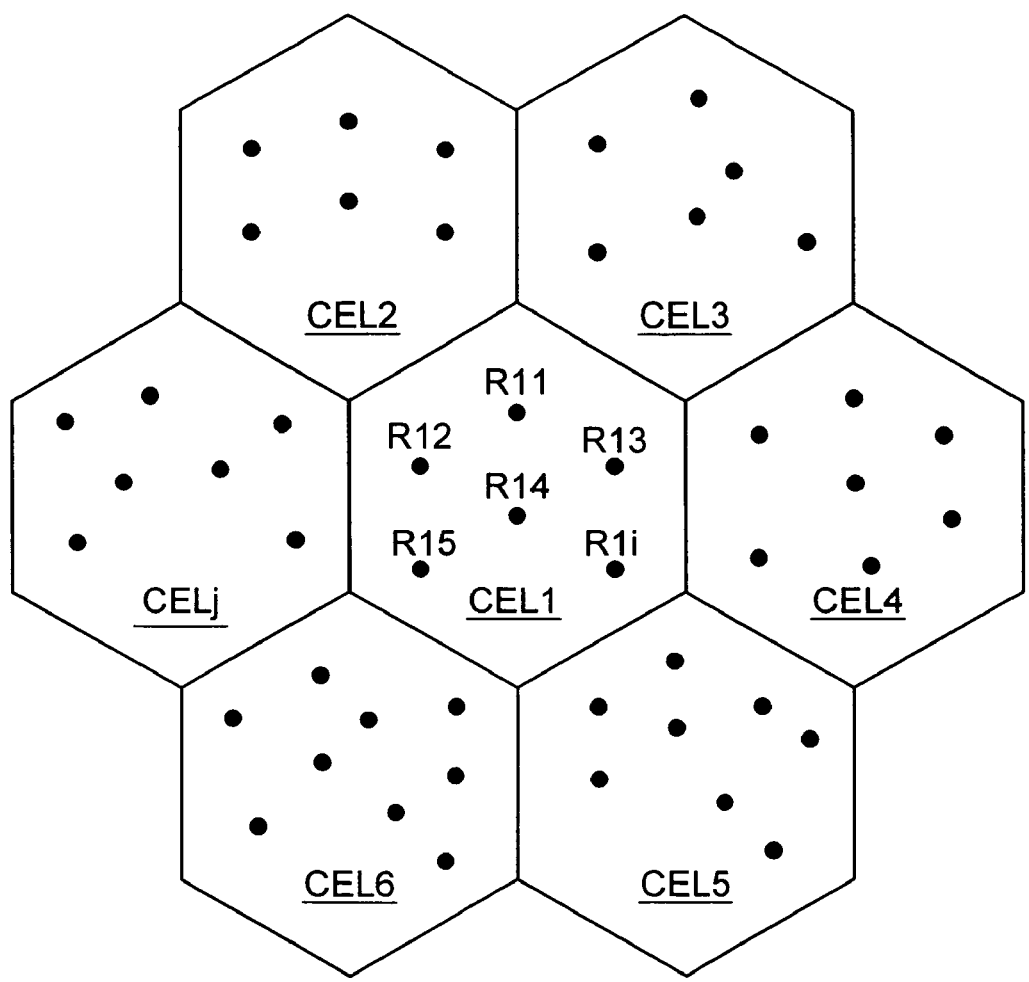
FIG. 10 is a diagram for explaining a method of forming latitude and longitude data according to the first embodiment.
Figure 11:
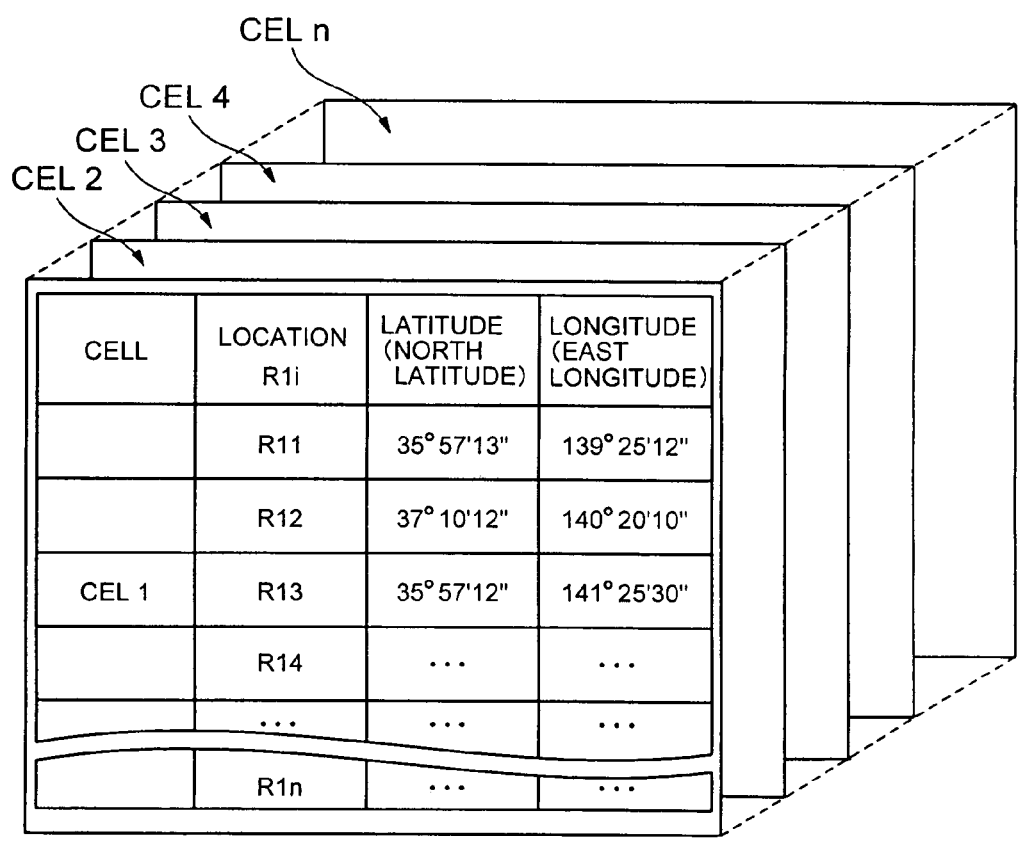
FIG. 11 is a diagram showing a structure of a latitude and longitude data base.

That is, when a description is given of reference data with regard to various locations in cell CEL1 shown by FIG. 10 as representative, as shown by FIG. 11, the latitude and longitude datas DRxy at various locations R11, R12, R13 through R1$i$ in the cell CEL1, are formed or edited into a data base in correspondence with the cell CEL1 and the various locations R11 through R1$i$.

Figure 12:
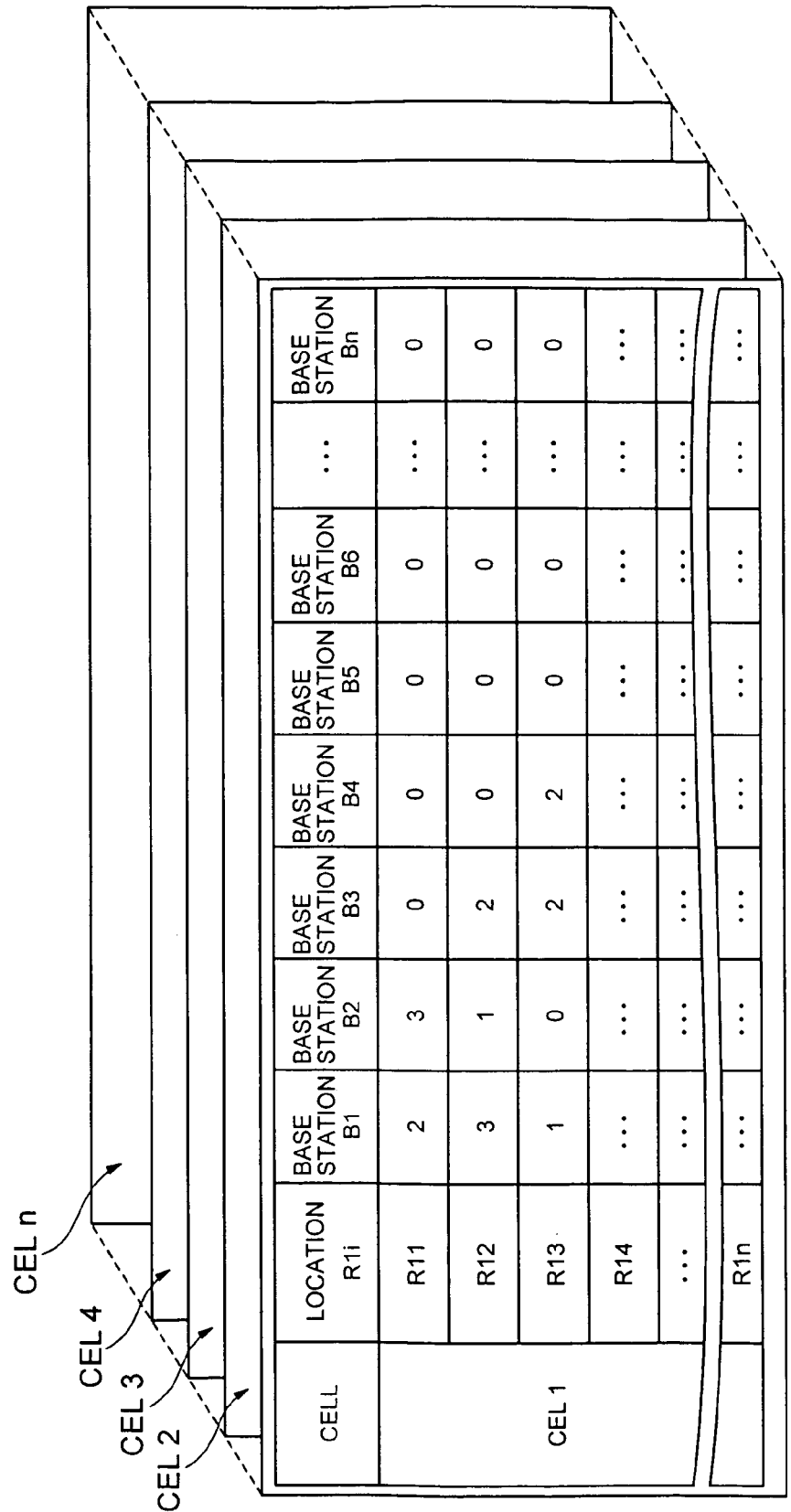
FIG. 12 is a diagram showing a structure of a multipath number data base.

Further, as shown by FIG. 12, data of multipath numbers actually measured through actual movement of the mobile station MDT to the respective locations R11 through R1$i$, are stored in correspondence with the cell CEL1 and the respective base stations B1 through Bn.

Figure 13:
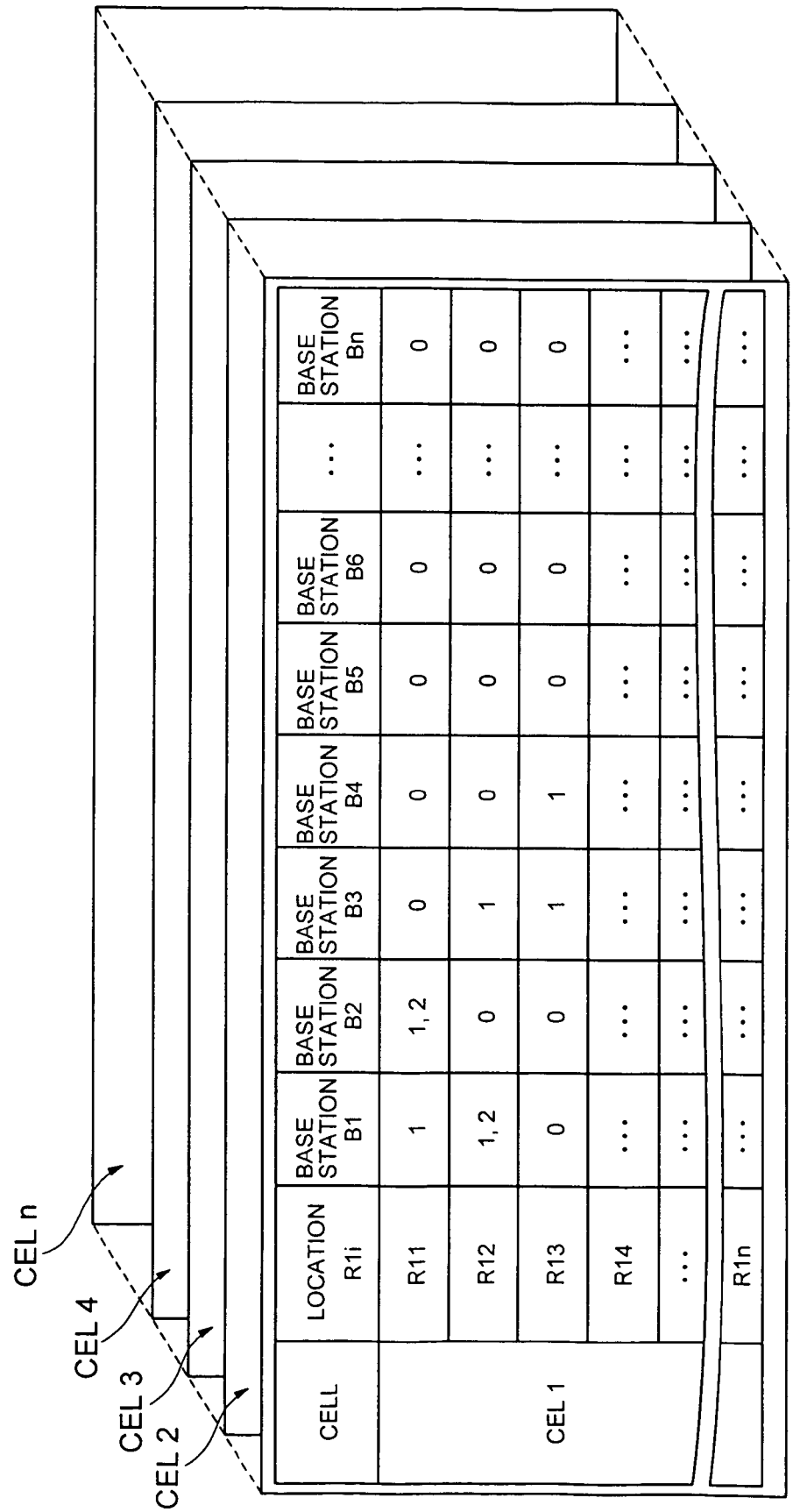
FIG. 13 is a diagram showing a structure of a multipath delay time data base.

Further, as shown by FIG. 13, datas of multipath delay time periods actually measured through actual movement of the mobile station MDT to the respective locations R11 through R1$i$, are stored in correspondence with the cell CEL1 and the respective base stations B1 through Bn.

Figure 14:
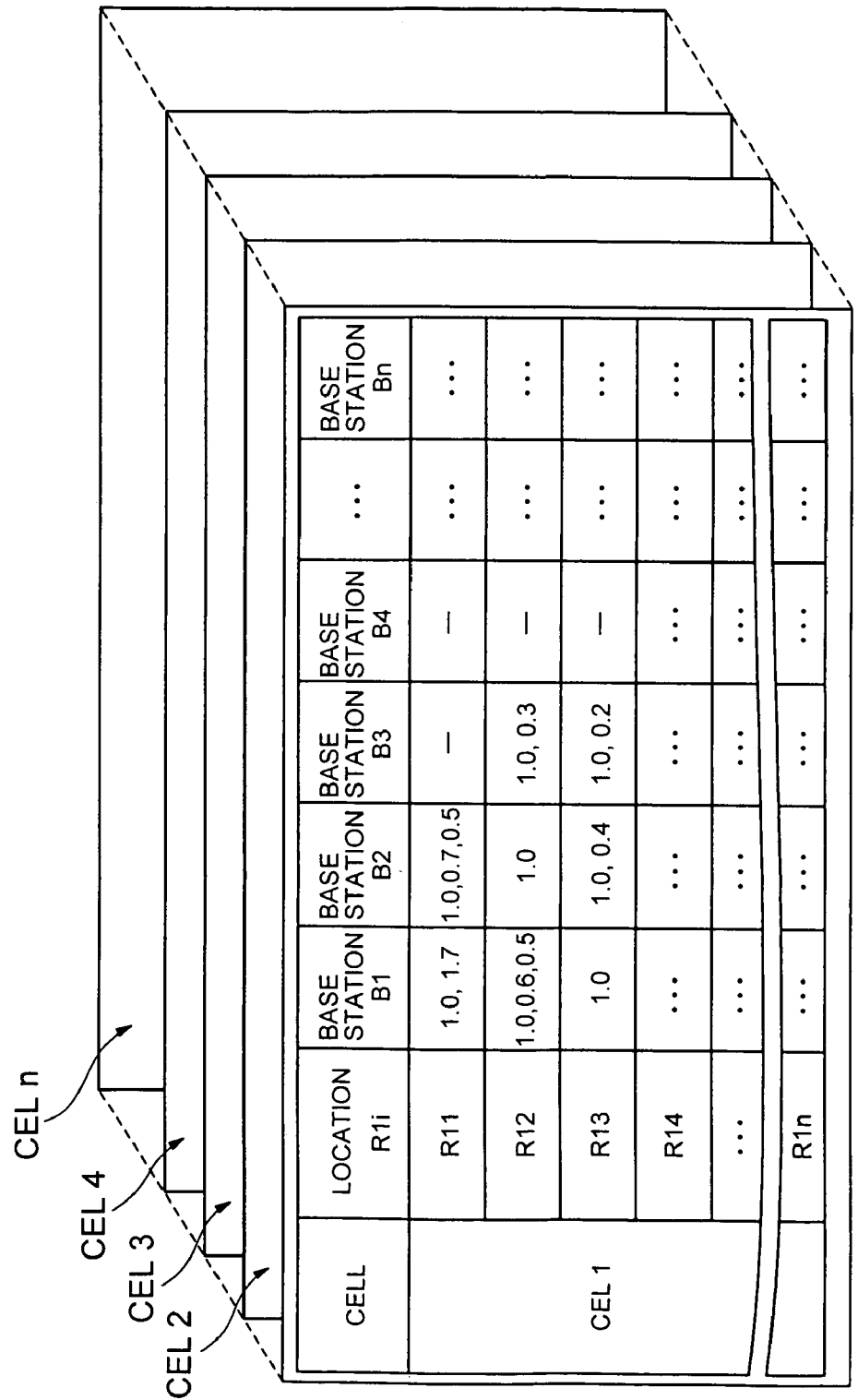
FIG. 14 is a diagram showing a structure of a multipath electric field intensity data base.

Further, as shown by FIG. 14, datas of multipath electric field intensity actually measured through actual movement of the mobile station MDT to the respective locations R11 through R1$i$, are stored in correspondence with the cell CEL1 and the respective base stations B1 through Bn.

Figure 15:
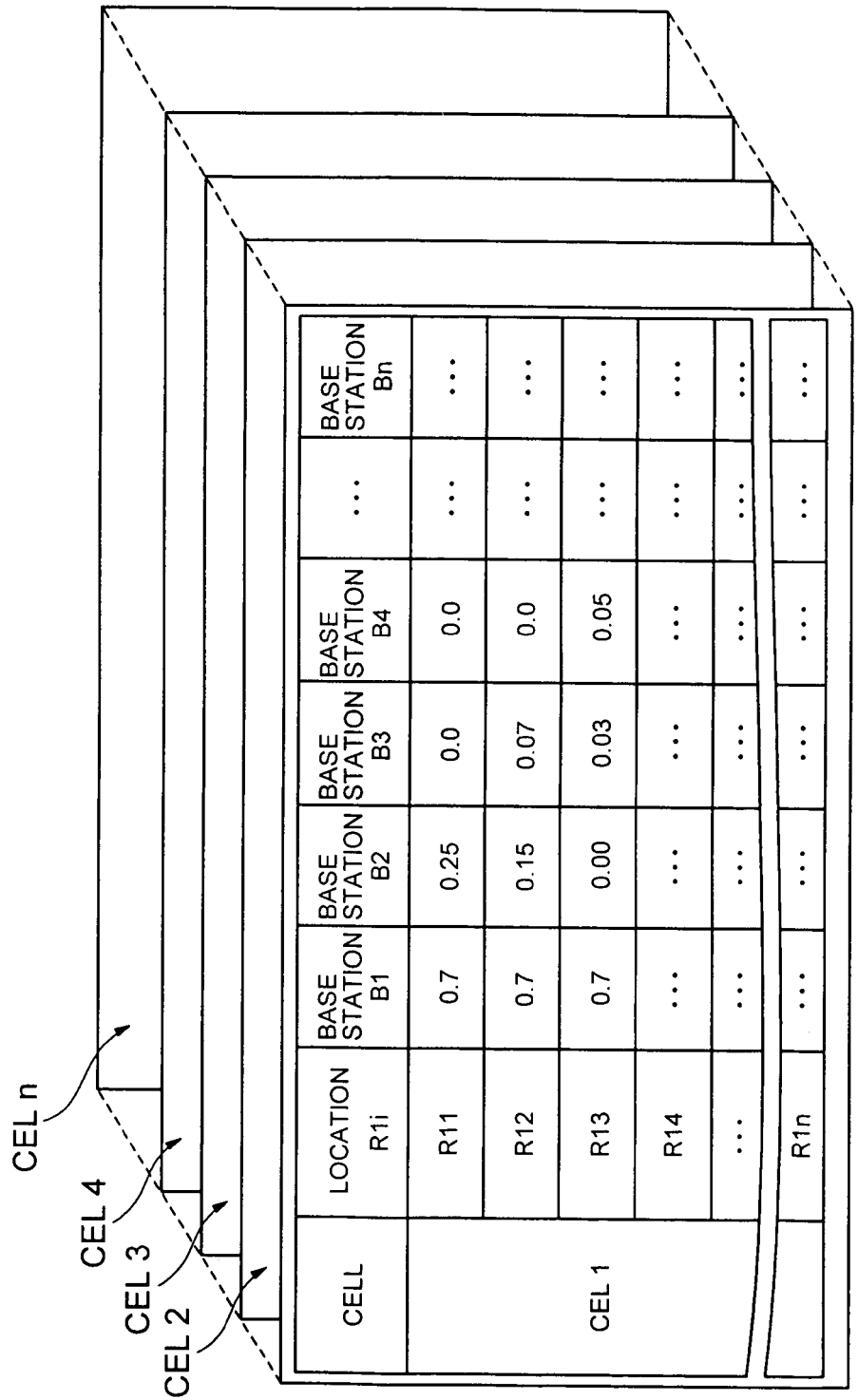
FIG. 15 is a diagram showing a structure of a base station electric field intensity data base.

Further, as shown by FIG. 15, datas of base station electric field intensity actually measured through actual movement of the mobile station MDT to the respective locations R11 through R1$i$, are stored in correspondence with the cell CEL1 and the respective base stations B1 through Bn.

Further, the latitude and longitude data DRxy at various locations in other cells CEL2 through CELn, datas of multipath number, data of multipath delay time period, data of multipath electric field intensity and data of base station electric field intensity which are actually measured through actual movement of the mobile stations MDT to the respective locations, are similarly stored in correspondence with the respective cells CEL2 through CELn and the respective base stations B1 through Bn as shown by FIG. 11 through FIG. 15.

The supplemental data storing portion $12b$ keeps map datas indicating geography of the respective locations stored to the position data storing portion $12a$ and surroundings thereof. That is, the supplemental data storing portion $12b$ stores data useful for users such as map data including names and addresses of the respective locations and information of public facilities, commercial facilities, road networks and so on positioned at surroundings of the respective locations in the cells CEL1 through CELn.

The position determining portion 10 receives the data DRXb reproduced by the receiving portion 8, that is, the received situation data Dcnd (DMP1 through DMPn, DLY1 through DLYn, DEM1 through DMn, DEB). Further, the position determining portion 10 searches reference data in the position data storing portion $12a$ shown by FIG. 12 through FIG. 15, determines reference data most similar to the respective data DMP1 through DMPn, DLY1 through DLYn, DEM1 through DEMn, DEB, searches the latitude and longitude data DRxy in correspondence with a result of the determination from the data base shown by FIG. 11 and supplies it to the transmitted data generating portion 11.

Further, there are calculated correlations between the reference data searched from the position data storing portion $12a$ and the received respective data DMP1 through DMPn, DLY1 through DLYn, DEM1 through DEMn, DEB and the latitude and longitude data DRxy is determined based on reference data providing a maximum correlation value.

That is, reference data is consecutively searched from the respective data bases shown in FIG. 12 through FIG. 15, there are calculated correlations between the received multipath number datas DMP1 through DMPn and the multipath number datas already stored at the multipath number data base shown in FIG. 12, correlations between the received multipath delay time period datas DLY1 through DLYn and the multipath delay time period datas already stored in the multipath delay time period data base shown in FIG. 13, correlations between the received multipath electric field intensity datas DEM1 through DEMn and the multipath electric field intensity datas already stored at the multipath electric field intensity data base shown by FIG. 14, and correlations between the received base station electric field intensity datas DEB and the base station electric field intensity datas already stored in the base station electric field intensity data base shown by FIG. 15 and a result of determination is constituted by the cell and the location when the respectively calculated correlation values become maximum values. Further, the latitude and longitude data DRxy in correspondence with the cell and the location determined therefrom is searched from the latitude and longitude data base of FIG. 11 and supplied to the transmitted data generating portion 11.

The transmitted data generating portion 11 searches through map data related to the cell and the location determined from the supplemental data storing portion 12b based on the latitude and longitude data DRxy supplied from the position determining portion 10, generates transmitted data DTXb by combining the searched map data and the latitude and longitude data DRxy and supplies it to the transmitting portion 13.

The transmitting portion 13 converts the transmitted data DTXb into a transmission signal STXb in the form of the W-CDMA system and transmits it to the mobile station MDT via the transmitting antenna 14.

When the transmission signal STXb is transmitted to the mobile station MDT in this way, the receiving portion 2 in the mobile station MDT shown in FIG. 1, receives the transmission signal STXb as the received signal SRXm and generates the reproduced signal DRXm and the data processing portion i.e. system controller 3 carries out various data processing, whereby useful information is provided to the user. For example, a map is displayed based on the map data on a display (illustration is omitted) provided at the mobile station MDT and the current position of the mobile station MDT is displayed by a mark or the like having excellent optical recognizing performance on the displayed map based on the latitude and longitude data DRxy. Thus, the user owning the mobile station MDT can easily appreciate the current position of the mobile station MDT by merely watching at the map and the mark displayed on the display. Therefore, the mobile communication system achieves what is called a navigation function for providing the current portion and geographical information at the surroundings thereof to the user who carries the mobile station MDT.

Figure 16:
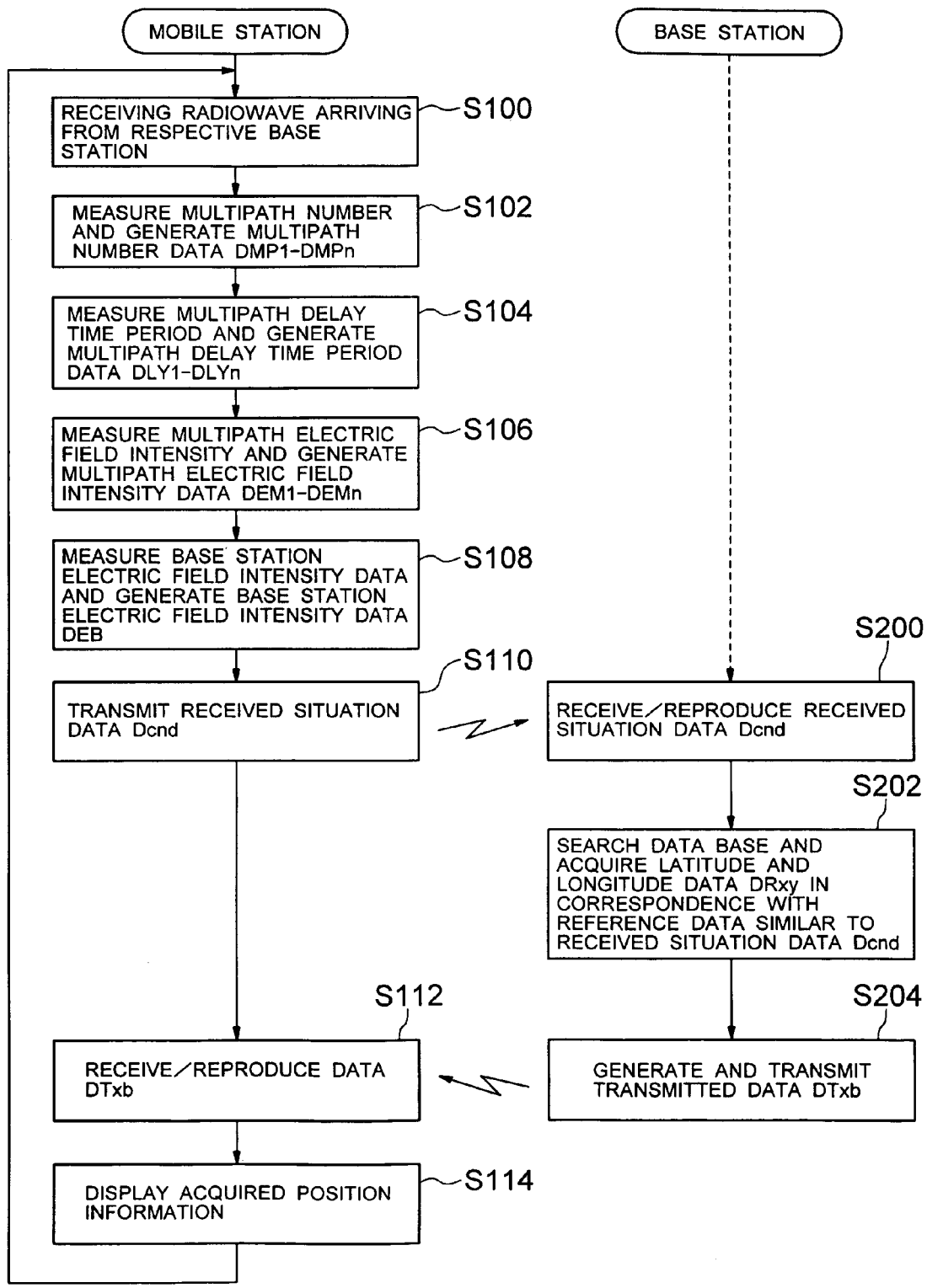
FIG. 16 is a flowchart for explaining operation of the first embodiment.

Next, an explanation will be given of position detecting operation of the mobile communication system having such a constitution in reference to a flowchart of FIG. 16. Further, a flow chart on the left side of FIG. 16 shows operation of the mobile station MDT and a flow chart on the right side shows operation of the base stations B1 through Bn.

The mobile station MDT receives radio waves coming from the respective base stations B1 through Bn (step S100) and carries out processings of steps S102 through S108 based on the received radio waves to thereby form the multipath number datas DMP1 through DMPn, the multipath delay time period datas DLY1 through DLYn, the multipath electric field intensity datas DEM1 through DEMn and the base station electric field intensity datas DEB. Further, the mobile station MDT generates the received situation data Dcnd summarizing the data DMP1 through DEMPn, DLY1 through DLYn, DEM1 through DEMn and DEB and transmits the data to the base stations (step S110).

Meanwhile, the position detection processing portion BDT of the base station receiving the received situation data Dcnd among the base stations B1 through Bn, reproduces the received situation data Dcnd (step S200), searches through reference data of the data base 12, determines reference data most similar to the received situation data Dcnd and acquires the latitude and longitude data DRxy in correspondence with the determined reference data (step S202). Further, the base station generates the transmitted data DTXb including the latitude and longitude data DRxy and the map data and transmits the data to the mobile station MDT (step S204).

Next, the mobile station MDT receives and reproduces the transmitted data DTXb (step S112) and provides the latitude and longitude data DRxy and the map data included in the transmitted data DTXb to the user by carrying out a processing of displaying the data on a display (step S114). Thus, the user owning the mobile station MDT can easily recognize the current position of the mobile station MDT by merely looking at the display showing a pattern based on the map data and the latitude and longitude data DRxy. Further, by repeating the processings from step S100, the current position of the mobile station MDT is provided to the user time to time.

When, at step S114, when the map data is transmitted (distributed) from the base station to the mobile station MDT, the base station may collect a certain distribution charge from the user.

In this way, according to the mobile communication system of the embodiment, there are calculated the multipath number datas DMP1 through DMPn, the multipath delay time period datas DLY1 through DLYn, the multipath electric field intensity datas DEM1 through DEMn and the base station electric field intensity datas DEB from the radio waves issued from the respective base stations B1 through Bn coming at the movement location of the mobile station MDT and the latitude and the longitude of the movement location of the mobile station MDT are determined based on the respective data and therefore, position detection with extremely high accuracy can be carried out. Particularly, by determining the latitude and the longitude of the movement location based on the multipath number and the multipath delay time periods, the current position of the mobile station MDT can finely be detected and there can be realized the mobile communication system capable of dealing with diversified mobile communication environments, for example, diversified business models.

According to the embodiment explained above, the movement location of the mobile station MDT is detected based on all of datas of the multipath number, the multipath delay time period, the multipath electric field intensity and the base station electric field intensity. However, it is, in practice, possible to detect the current position of the mobile station MDT without depending on all of the information of the multipath related data.

That is, it is possible to omit steps S104, S106 and S108 in FIG. 16 and the received situation data Dcnd including only the multipath number data DMP1 through DMPn calculated at step S102, is transmitted to the base station at step S110 to thereby detect the current position of the mobile station MDT.

When according to such a constitution, the mobile station MDT is placed at a location in arbitrary cell CELk, when the despreading circuit 6b in the cell search portion 6 shown in FIG. 1, calculates correlations between the received signal SRXm' and the despreading code series Sbs1 through Sbsn for determining the base station, a correlation signal Scvk in correspondence with a radio wave coming from the base station Bk arranged in the cell CELk, becomes the largest correlation value and accurately indicates the position of the mobile station MDT. Therefore, the multipath number MPk measured by the multipath number measuring portion 4a based on the correlation signal Scvk, is transmitted towards the base station and there is referred the multipath number data base of FIG. 12 stored to the data base 4e on the side of the base station, whereby the current position of the mobile station MDT can be calculated accurately and finely.

In case the processings at steps S104, S106 and S108 are omitted, it is not necessary to provide the multipath delay amount measuring portion 4b, the multipath electric field intensity measuring portion 4c and the base station electric field intensity measuring portion 4d and therefore, the constitution of the mobile station MDT can be simplified.

Further, there may be so arranged that processings of steps S102, S106 and S108 in FIG. 16 are omitted and the received situation data Dcnd including only the multipath delay time period datas DLY1 through DLYn calculated at step S104, are transmitted towards the base station at step S110 thereby to detect the current position of the mobile station MDT.

According to such a constitution, the mobile station MDT is placed at a certain location in arbitrary cell CELk, the despreading circuit 6b in the cell search portion 6 shown in FIG. 2 calculates correlations between the received signal SRXm' and the despreading code series Sbs1 through Sbsn for determining the base station, a correlation signal Scvk in correspondence with a radio wave coming from the base station Bk arranged in the cell CELk, takes the largest correlation value and the position of the mobile station MDT can be accurately indicated. Therefore, the current position of the mobile station MDT can be accurately and finely detected by transmitting a multipath delay time period LYk measured by the multipath delay amount measuring portion 4b based on the correlation signal Scvk, towards the base station and referring the multipath number data base of FIG. 13 stored at the data base 4e on the side of the base station.

When, further, in accordance with omission of the processings of the steps S102, S106 and S108 are omitted, it is not necessary to provide the multipath number measuring portion 4a, the multipath electric field intensity measuring portion 4c and the base station electric field intensity measuring portion 4d and accordingly, the constitution of the mobile station MDT can be simplified.

Further, in detecting the movement position of the mobile station MDT, the position of the mobile station MDT may be detected by constituting main data by either of the multipath number and the multipath delay time period and constituting auxiliary data by data of the multipath electric field intensity and the base station electric field intensity.

When, in this way, there is so constructed that only either of the multipath number and the multipath delay time period is utilized for detecting the position of the mobile station MDT or the position of the mobile station MDT is detected with information of the multipath electric field intensity and the base station electric field intensity as auxiliary data, the simplified constitution of the position analyzing portion 4 and a reduction in storage capacity of the data base 12 in the position detection processing portion BDT on the side of the base station can be realized.

Further, according to the embodiment, there is so constructed that the map data is previously stored at the supplemental data storing portion 12b in the position detection processing portion BDT on the side of the base station and the map data is transmitted (distributed) towards the mobile station MDT by being combined with the latitude and longitude data DRxy.

However, there may be so constructed that the map data is previously stored at a predetermined storing portion (illustration is omitted) in the data processing portion i.e. system controller 3 of the mobile station MDT, when the latitude and longitude data DRxy is transmitted from the position detection processing portion BDT, the data processing portion i.e. system controller 3 of the mobile station MDT searches map data related to the latitude and longitude data DRxy from the storing portion and the searched map data and the latitude and longitude data DRxy may be displayed on a display, even not illustrated.

Further, as a method of previously storing the map data in the predetermined storing portion in the data processing portion and system controller 3 of the mobile station MDT, an information recording medium such as CD or DVD carrying the map data may be provided to the user and the map data of the information recording medium may be downloaded to the data processing portion and system controller 3 of the mobile station MDT. Further, separately from the latitude and longitude data DRxy, in accordance with request of the user, only map data previously stored to the supplemantal data storing portion 12b in the position detection processing portion BDT may be transmitted (distributed) towards the mobile station MDT and downloaded to the data processing portion and system controller 3.

Further, although according to the embodiment, there is so constructed that as shown by FIG. 3, the position data storing portion 12a and the position determining portion 10 are provided in the position detection processing portion BDT on the side of the base station, the position data storing portion 12a and the position determining portion 10 may be provided in the mobile station MDT shown in FIG. 2 and the latitude and longitude data DRxy determined by the position determining portion 10 may be transmitted to the position detection processing portion BDT on the side of the base station. Further, there may be so constructed that the transmitted data generating portion 11 in the position detection processing portion BDT receiving the latitude and longitude data DRxy, acquires map data in correspondence with the latitude and longitude data DRxy from the proposed data storing portion 12b in the data base 12 and the map data are returned towards the mobile station MDT as the transmitted data DTXb.

Further, according to such constitution, the mobile station MDT per se determines the current position and therefore, the latitude and longitude data DRxy may be transmitted to the position detection processing portion BDT on the side of the base station only when the user intends to acquire the map data. Further, when the map data is transmitted (distributed) from the base station to the mobile station MDT, the base station may collect constant distribution charge amount from the user.

In this way, constitutions of the mobile station MDT and the position detection processing portion BDT shown in FIG. 2 and FIG. 3 may pertinently be dispersed to the mobile station MDT and the base station in accordance with desired design or specifications.

(Second Embodiment)

Next, an explanation will be given of a second embodiment of the invention in reference to FIG. 17 through FIG. 22.

Figure 17:
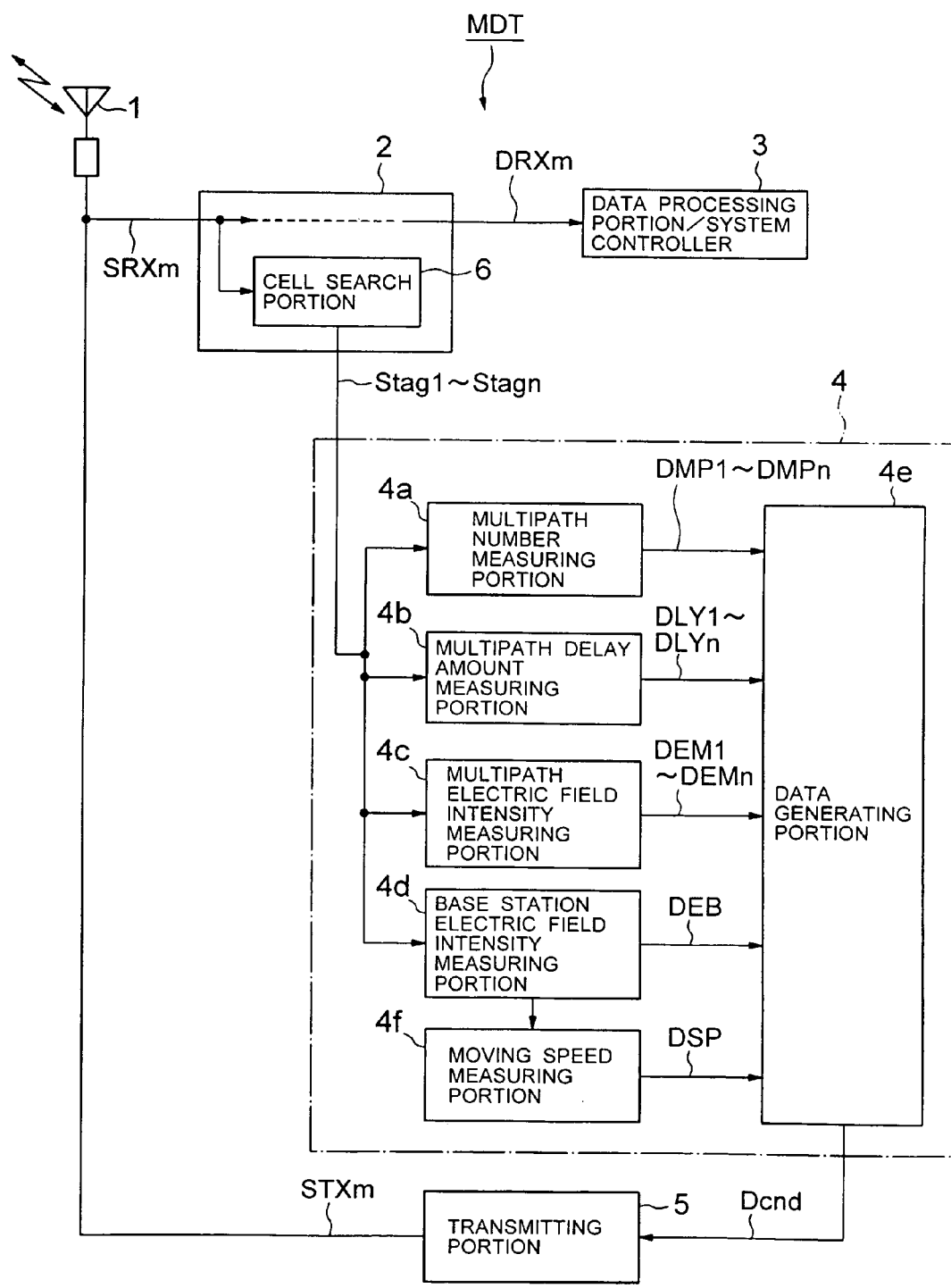
FIG. 17 is a block diagram showing a constitution of a mobile station according to a second embodiment.
Figure 18:
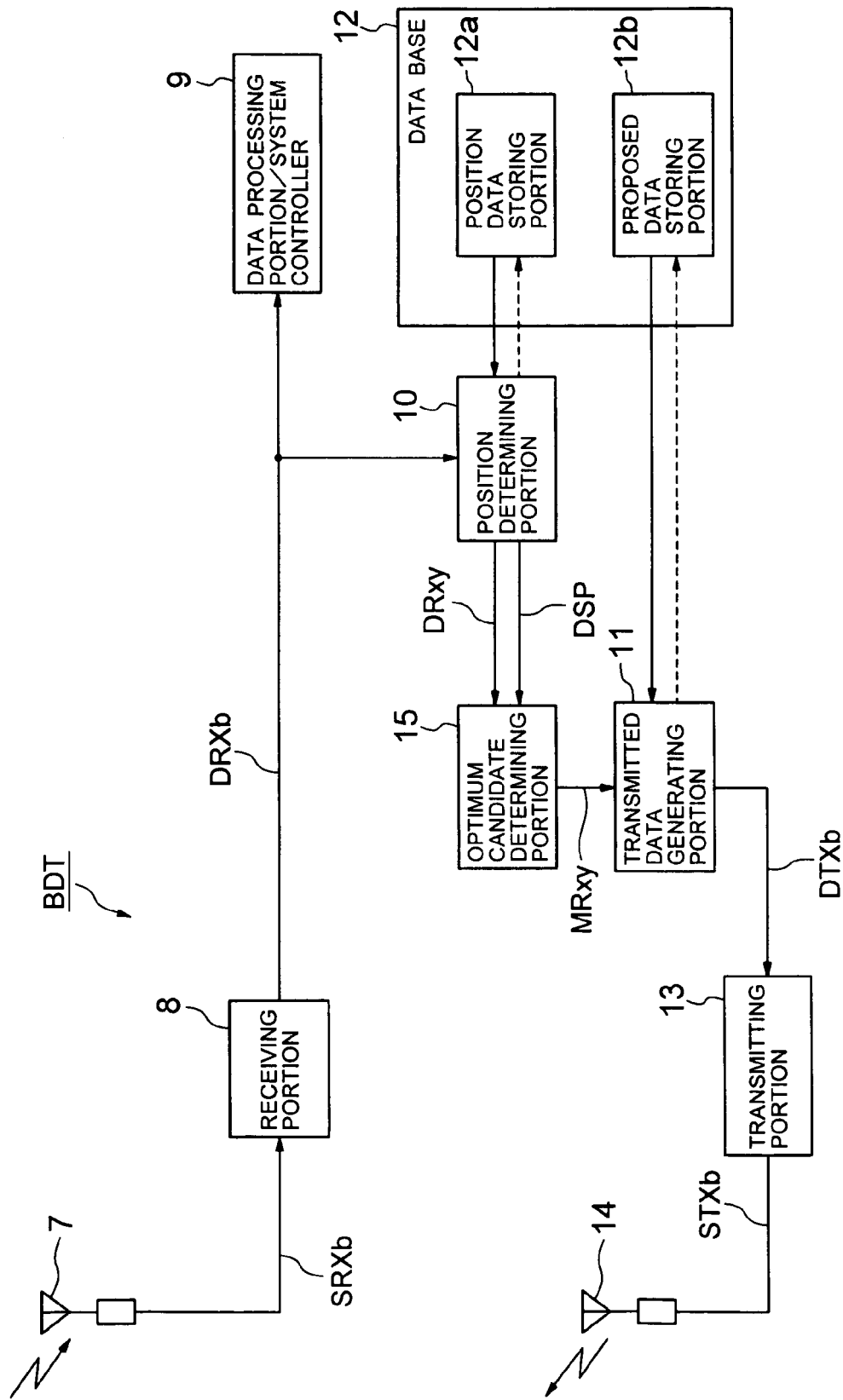
FIG. 18 is a block diagram showing a constitution of a base station according to the second embodiment.

FIG. 17 is a block diagram showing a constitution of the mobile station MDT according to the embodiment and the same portions as or portions in correspondence with those of FIG. 2 are indicated by the same notations. Further, FIG. 18 is a block diagram showing a constitution of the position detection processing portion BDT provided to the respective base stations B1 through Bn according to the embodiment and the same portions as or portions in correspondence with those of FIG. 3 are indicated by the same notations.

In FIG. 17, the mobile station MDT is provided with a moving speed measuring portion 4f in addition to the constitution of the position analyzing portion 4 shown in FIG. 2.

The moving speed measuring portion 4f inputs datas of the electric field intensities EB1 through EBn of the ratio waves coming from the respective base stations B1 through Bn generated by the base station electric field intensity measuring portion 4d. That is, the moving speed measuring portion 4f inputs data of the electric field intensities EB1 through EBn before being subjected to the normalizing processing.

Figure 19:
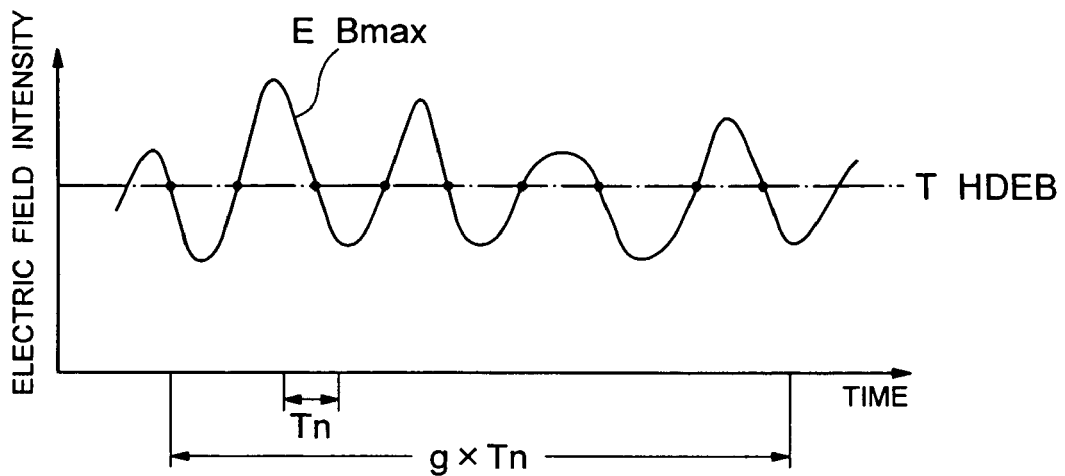
FIG. 19 is a diagram for explaining a method of measuring moving speed of a mobile station.

Further, as shown by FIG. 19, at every predetermined period Tn for generating an n number of the electric field intensities EB1 through EBn, there is extracted data EBmax of the largest electric field intensity in the electric field intensities EB1 through EBn. Further, a change in the data EBmax provided at the respective period Tn is compared with a predetermined threshold THDEB, there is calculated a number of times NEB by which the data EBmax intersects with the threshold THDEB during a time period g'Tn of the period Tn multiplied by an integer and an inverse number of the number of times NEB, is defined as moving speed V(=1/NEB) of the mobile station MDT. Further, speed data Dsp indicating the measured moving speed V is supplied to the data generating portion 4e.

The data generating portion 4e generates characteristic datas (DMP1 through DMPn, DLY1 through DLYn, DEM1 through DEMn, DEB, Dsp) by summarizing the speed data Dsp from the moving speed measuring portion 4f, the multipath number datas DMP1 (MP1, TAG1) through DMPn (MPn, TAGn) with identification codes from the multipath number measuring portion 4a, the propagation delay time period datas DLY1 (LY1, TAG1) through DLYn (LYn, TAGn) with identification codes from the multipath delay amount measuring portion 4b, the multipath electric field intensity datas DEM1 (EM1, TAG1) through DEMn (EMn, TAGn) with identification codes from the multipath electric field intensity measuring portion 4c and the base station electric field intensity data DEB (em1 through emn) from the base station electric field intensity measuring portion 4d, and adds identification data (telephone number) Did of the mobile station MDT to the characteristic data to thereby generate the received situation datas Dcnd (DMP1 through DMPn, DLY1 through DLYn, DEM1 through DEMn, DEB, Dsp, Did), supplies thereof to the transmitting portion 5 and transmits thereof towards the base station.

Next, the position detection processing portion BDT shown in FIG. 18 is provided with an optimum candidate determining portion 15 in addition to the constitution shown in FIG. 3.

In this case, the position determining portion 10 inputs the data DRXb reproduced by the receiving portion 8, that is, the received situation data Dcnd (DMP1 through DMPn, DLY1 through DLYn, DEM1 through DEMn, DEB, Dsp, Did) transmitted from the mobile station MDT, searches reference data within the position data storing portion 12a shown in FIG. 12 through FIG. 15, determines a plurality of pieces of reference data similar to the characteristic datas DMP1 through DMPn, DLY1 through DLYn, DEM1 through DEMn and DEB, and supplies a plurality of pieces of the latitude and longitude data DRxy in correspondence with the result of the determination to the optimum candidate determining portion 15.

Further, the speed data Dsp in the received situation data Dcnd is also transmitted to the optimum candidate determining portion 15 along with the latitude and longitude data DRxy.

Further, in determining the plurality of pieces of reference data similar to the respective characteristic datas DMP1 through DMPn, DLY1 through DLYn, DEM1 through DEMn, and DEB, by carrying out comparatively liberal determination in which objects of determination are constituted even by reference data which are similar to only portions of data of the characteristic datas DMP1 through DMPn, DLY1 through DLYn, DEM1 through DEMn and DEB, a plurality of pieces of the latitude and longitude data DRxy in correspondence with a result of the determination are supplied to the optimum candidate determining portion 15. Further, there are calculated correlations between the characteristic datas DMP1 through DMPn, DLY1 through DLYn, DEM1 through DEMn and DEB and the reference data and the reference data having a correlation value equal to or larger than a predetermined value is determined to be similar.

Further, the position determining portion 10 does not determine the plurality of pieces of latitude and longitude data DRxy by inputting the received situation data Dcnd transmitted from the side of the mobile station MDT only once but the received situation data Dcnd transmitted from the side of the mobile station MDT during a constant period, are inputted by a plurality of times and there are determined a plurality of pieces of reference data similar to the characteristic datas DNP1 through DMPn, DLY1 through DLYn, DEM1 through DEMn and DEB provided at the respective time and a plurality of pieces of the latitude and longitude data DRxy in correspondence with a result of the determination are supplied to the optimum candidate determining portion 15. Further, in this embodiment, the received situation data Dcnd is inputted by three times.

Therefore, the position determining portion 10 determines the plurality of pieces of the latitude and longitude data DRxy at respective time of receiving the received situation data Dcnd and supplies the data to the optimum candidate determining portion 15.

The optimum candidate determining portion 15 generates optimum position data MRxy indicating the current position of the mobile station MDT based on the plurality of pieces of latitude and longitude data DRxy supplied from the position determining portion 10 over a plurality of times.

An explanation will be given of an algorism of generating the optimum position data MRxy based on a specific example. When, for example, the plurality of pieces of latitude and longitude data DRxy at a first time supplied from the position determining portion 10 are PS11 through PS13, the latitude and longitude data DRxy at a second time are PS21 through PS23 and the latitude and longitude data DRxy at a third time are PS31 through PS33, on coordinates of latitude and longitude shown by FIG. 20, the latitude and longitude datas PS11 through PS13, PS21 through PS23 and PS31 through PS33 are respectively aligned, times of occurrence of the same candidate are accumulatedly added, and a gravitational center position (latitude and longitude) constituting the largest value in the accumulatedly added average value distribution, is determined as a potential candidate MRxy' representing the current position of the mobile station MDT.

Further, a value of the speed data Dsp is compared with a predetermined threshold THDsp and when the speed data Dsp having a value larger than the threshold THDsp is provided, it is determined that the candidate MRxy' indicates the current position of the mobile station MDT and the candidate MRxy' is supplied to the transmitted data generating portion 11 as optimum position data MRxy (=MRxy').

Meanwhile, when the speed data Dsp having a value larger than the threshold THDsp is not provided, the optimum position data MRxy calculated at a preceding processing is made to constitute the optimum position data MRxy as it is and supplied to the transmitted data generating portion 11.

When the optimum position data MRxy is supplied, the transmitted data generating portion 11 searches map data in correspondence with the optimum position data MRxy from the supplemental data storing portion 12b and generates transmitted data DTXb by combining the searched map data and the optimum position data MRxy and supplies the data to the transmitting portion 13. Further, the data is transmitted towards the mobile station MDT via the transmitting portion 13.

When, in this way, the transmitted data DTXb is transmitted to the mobile station MDT, the receiving portion 2 in the mobile station MDT shown in FIG. 17, reproduces the transmitted data DTXb as received data DRXm and the data processing portion and system controller 3 carries out various data processings to thereby provide useful information to the user. For example, a map is displayed on a display (not illustrated) provided at the mobile station MDT based on the map data and the current position of the mobile station MDT is displayed by a mark having an excellent optical recognizing performance on the displayed map based on the optimum position data MRxy. Thus, there is achieved what is called a navigation function for providing geographical information of the current position and the periphery thereof and the user owning the mobile station MDT can easily recognize the current position of one's own by merely looking at the map and the mark superposed on the display.

In this way, according to the embodiment, the optimum candidate determining portion 15 in the position detection processing portion BDT provided at each of the base stations B1 through Bn, investigates a frequency of occurrence of the plurality of pieces of latitude and longitude data DRxy and generates the optimum position data MRxy indicating the current position of the mobile station MDT based on the latitude and the longitude having the highest frequency of occurrence and therefore, the current position of the mobile station MDT can be detected with high accuracy.

Further, according to communication of a multiple access system such as W-CDMA, even when a distance from the base station to the mobile station stays the same, the electric field intensity of arriving radio wave is significantly changed by influence of fading and generally, as long as the moving speed of the base station is small, a dispersion in the electric field intensity is increased. However, according to the embodiment, the moving speed V of the mobile station MDT is measured, and when the speed data Dsp indicating the moving speed V becomes larger than the predetermined threshold THDsp, it is determined that the optimum position data MRxy is data indicating the current position of the mobile station MDT and therefore, the current position of the mobile station MDT can be detected with extremely high accuracy.

Although, according to the embodiment, the position detection processing portion BDT investigates a similarity with the reference data in the position data storing portion 12a shown in FIG. 12 through FIG. 15 based on the datas DMP1 through DMPn, DLY1 through DLYn, DEM1 through DEMn and DEB in the received situation data Dcnd, the candidate MRxy' of the latitude and longitude data may be calculated by investigating the similarity between one data or a plurality of combined data in the datas DMP1 through DMPn, DLY1 through DLYn, DEM1 through DEMn, and DEB and the reference data in the position data storing portion 12a.

Although, as shown in FIG. 17, the moving speed measuring portion 4f generates the speed data DSP indicating the moving speed V of the mobile station MDT based on the data of the electric field intensities EB1 through EBn generated by the base station electric field intensity measuring portion 4d before being subjected to the normalizing processing, the invention is not limited thereto but there may be so constructed that the moving speed measuring portion 4f generates speed data Dsp indicating the moving speed V of the mobile station MDT based on the correlation signals Scv1 through Scvn generated by correlation calculation by the cell search portion 6.

According to the mobile communication system explained in reference to FIG. 17 through FIG. 20, the position determining portion 10 and the data base 12 and the optimum candidate determining portion 15 are provided on the side of the position detection processing portion BDT and the position of the mobile station MDT is determined by the side of the position detection processing portion BDT. However, the invention is not limited thereto but there may be so constructed that the position is determined by the side of the mobile station MDT and a result of the determination is transmitted towards the position detection processing portion BDT.

Figure 21:
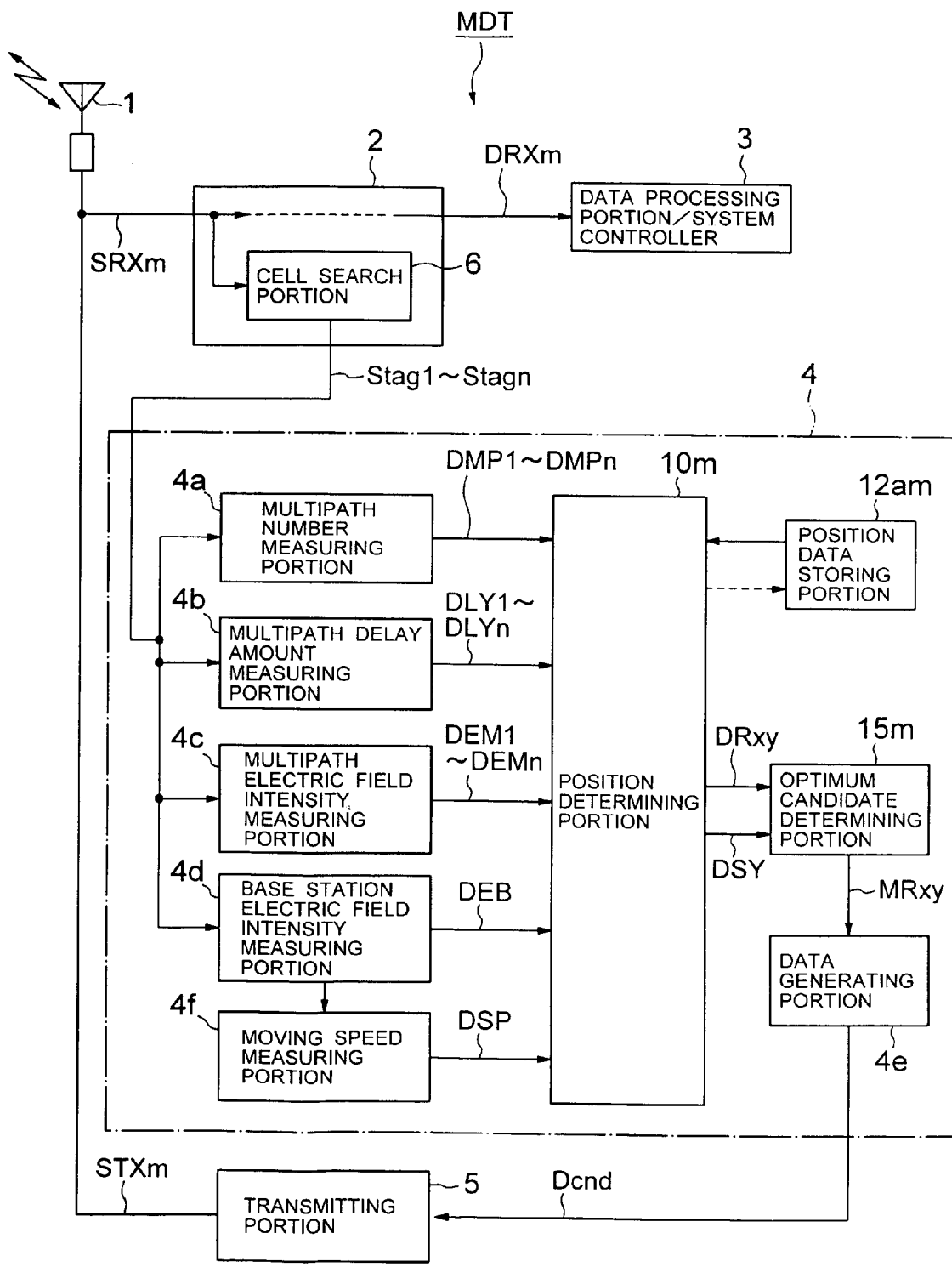
FIG. 21 is a block diagram showing a constitution of a modified example of a mobile station according to the second embodiment.
Figure 22:
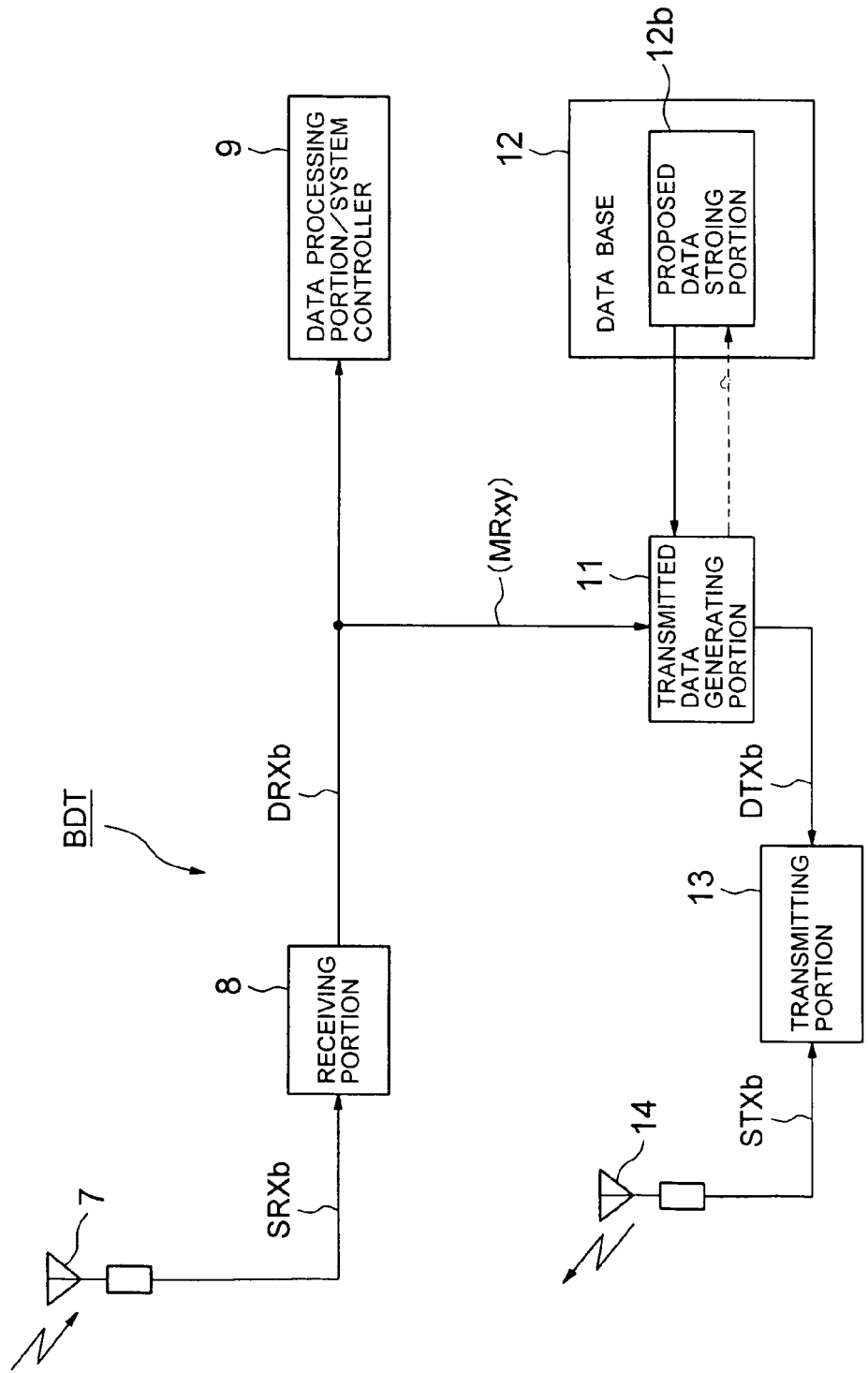
FIG. 22 is a block diagram showing a constitution of a modified example of a base station according to the second embodiment.

That is, as a modified example of the embodiment, the mobile station MDT may be so constructed by a constitution shown in FIG. 21 and the position detection processing portion BDT may be constructed by a constitution shown in FIG. 22.

That is, as shown by FIG. 21, the mobile station MDT is so constructed that there are provided a position determining portion 10m, a data base 12am and an optimum candidate determining portion 15m in correspondence with the position determining portion 10 and the position data storing portion 12a and the optimum candidate determining portion 15 of the position detection processing portion BDT shown in FIG. 18, meanwhile, as shown by FIG. 22, the position detection processing portion BDT is not provided with the position determining portion 10 and the position data storing portion 12a and the optimum candidate determining portion 15.

Further, according to the mobile station MDT shown in FIG. 21, the position determining portion 10m searches a plurality of pieces of reference data similar to the datas DMP1 through DMPn, DLY1 through DLYn, DEM1 through DEMn and DEB indicating the respective received situation and supplied from the multipath measuring portion 4a, the multipath delay amount measuring portion 4b, the multipath electric field intensity measuring portion 4c, the base station electric field intensity measuring portion 4d and the moving speed measuring portion 4f, from the position data storing portion 12am, searches the plurality of pieces of latitude and longitude data DRxy in correspondence with a plurality of pieces of reference data from the position data storing portion 12am and supplies them to the optimum candidate determining portion 15m along with the speed data Dsp.

The optimum candidate determining portion 15m determines the candidate MRxy' indicating the current position of the mobile station MDT per se based on the latitude and longitude data DRxy and the speed data Dsp by a processing similar to that of the optimum candidate determining portion 15, determines a most pertinent candidate in the candidate MRxy', generates the optimum position data MRxy and supplies the data to the data generating portion 4e.

Further, the data generating portion 4e constitutes the transmitted data Dcnd by the optimum position data MRxy and the identification code data Did and transmits the data towards the position detection processing portion BDT via the transmitting portion 5.

Meanwhile, according to the position detection processing portion BDT shown in FIG. 22, the receiving portion 8 reproduces the optimum position data MRxy and the identification code data Did transmitted from the mobile station MDT as received data DRxb, and the transmitted data generating portion 11 searches map data in the proposed data storing portion 12b based on the reproduced optimum position data MRxy, constitutes transmitted data DTXb by the searched map data and transmits the data towards the mobile station MDT via the transmitting portion 13. Further, the data processing portion and system controller 3 in the mobile station MDT displays a map on a display (not illustrated) based on the map data and displays the current position of the mobile station MDT by a mark having excellent optical recognizing performance on the displayed map based on the latitude and longitude data DRxy. Thus, there is achieved what is called a navigation function for providing geographical information of the current position and a periphery thereof and the user owning the mobile station MDT can easily recognize the current position of one's own by merely looking at the map and the mark superposed on the display.

Further, in the case of such a modified example, the mobile station MDT per se determines the current position and therefore, there may be constructed a constitution in which the transmitted data Dcnd is constituted by the optimum position data MRxy and the identification code data Did and transmitted towards the position detection processing portion BDT via the transmitting portion 5 only when the user intends to acquire the map data.

Further, in the embodiment and the modified example, there may be constructed a constitution in which the transmitted data Dcnd is constituted by the optimum position data MRxy and the identification code data Did and transmitted from the mobile station MDT towards the base station and in accordance therewith, when the map data is transmitted (distributed) from the side of the base station to the mobile station MDT, constant distribution charge may be collected by the base station from the user.

Third Embodiment

Figure 23:
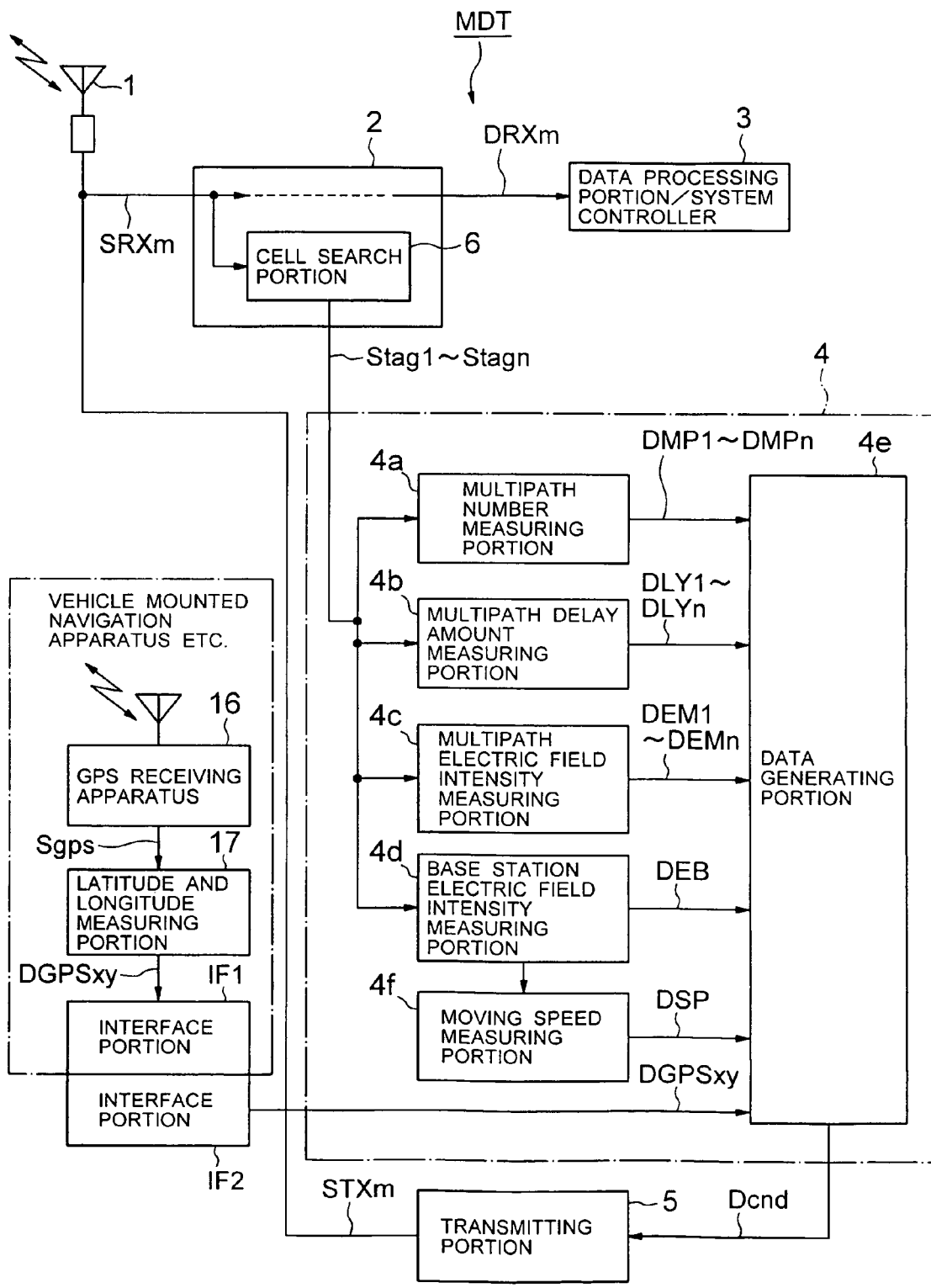
FIG. 23 is a block diagram showing a constitution of a mobile station according to a third embodiment.
Figure 24:
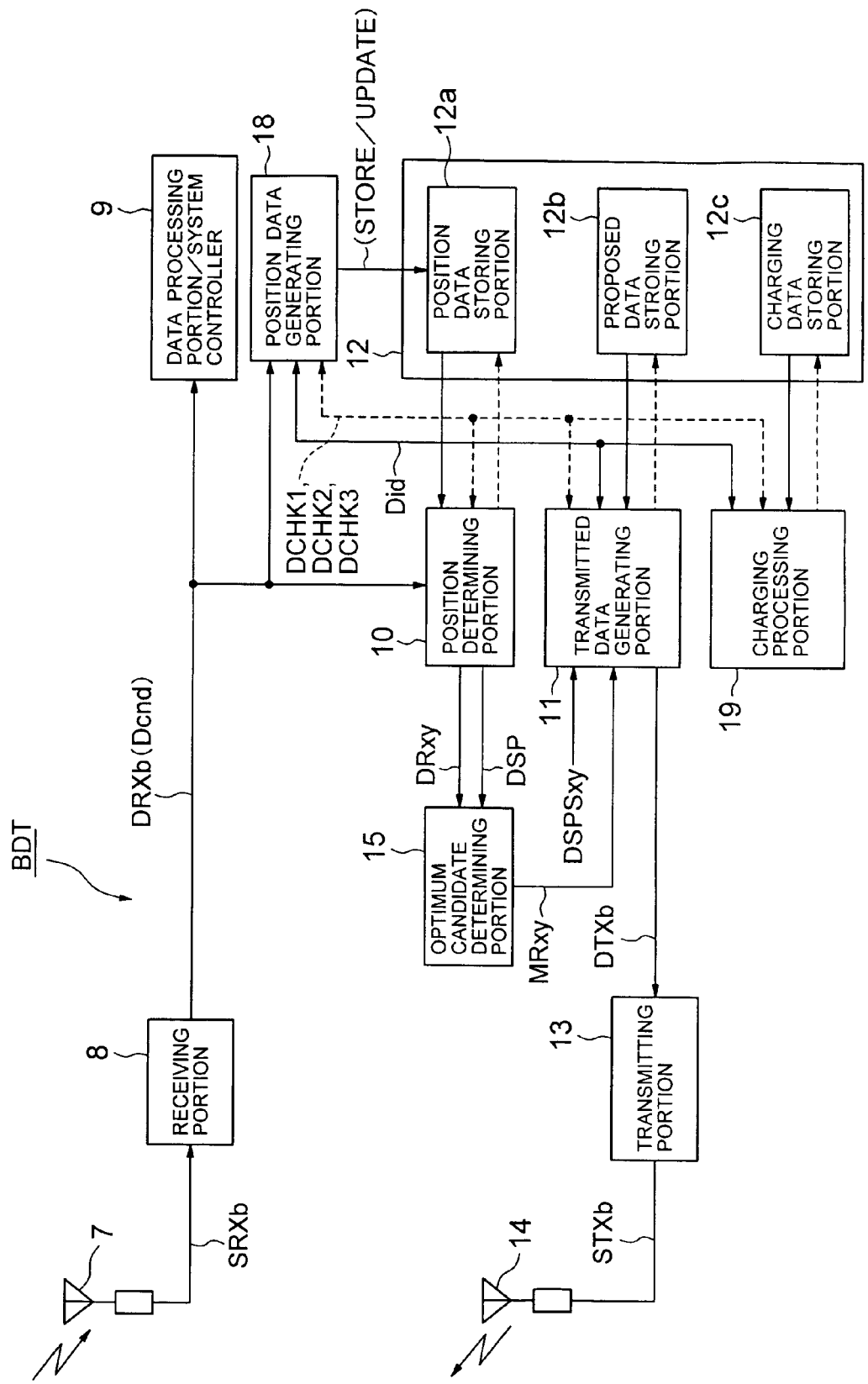
FIG. 24 is a block diagram showing a constitution of a base station according to the third embodiment.

Next, an explanation will be given of a third embodiment of the invention in reference to FIG. 23 through FIG. 27. Further, FIG. 23 is a block diagram showing a constitution of the mobile station MDT according to the embodiment and the same portions as or portions in correspondence with those in FIG. 17 are designated by the same notations. Further, FIG. 24 is a block diagram showing a constitution of the position detection processing portion BDT provided to each of the base stations B1 through Bn according to the embodiment and the same portions as or portions in correspondence with those in FIG. 18 are designated by the same notations.

According to the first and the second embodiments, an enterprise of the mobile communication system actually measures reference data and stores the actually measured reference data to the position data storing portion 12a at each of the base stations B1 through Bn or the position data storing portion 12am in the mobile station MDT to thereby previously construct the data base for searching the position data as shown by FIG. 3, FIG. 18 and FIG. 21.

In contrast thereto, according to the embodiment, the data base is not constructed only based on the reference data which is previously measured actually by the enterprise of the mobile communication system but the reference data is generated based on the received situation data Dcnd transmitted from the mobile station MDT and a more large-scaled and finer data base can be constructed by storing or updating the reference data in the position data storing portion 12a of the data base 12.

Further, there is provided charge account processing means for reducing charge of utilizing the mobile communication system for a user providing the received situation data Dcnd for constructing the data base under a constant condition.

In FIG. 23, the mobile station MDT according to the embodiment is provided with an interface portion IF2 for connecting to an electronic apparatus for measuring the current position such as a vehicle mounted navigation apparatus, a portable personal computer or a portable moving terminal apparatus having current position measuring means.

For example, when a user owns an electronic apparatus having a GPS receiving apparatus 16 for receiving a GPS radio wave signal coming from a GPS (Global Positioning System) satellite, a latitude and longitude measuring portion 17 for calculating the current position (latitude and longitude) by the principle of trigonometrical survey based on a GPS received signal Sgps and an interface portion IF1 for outputting latitude and longitude data DGPSxy generated by the latitude and longitude measuring portion 17 to outside, the interface portion IF2 of the mobile station MDT can be connected attachably and detachably to the interface portion IF1.

Further, there is provided a transmission start button switch (not illustrated) at a cabinet of the mobile station MDT and when a user operates the transmission start button switch to be ON, in the case in which the mobile station MDT is connected to the electronic apparatus by the interface portions IF1 and IF2 and in the case in which the mobile station MDT is not connected to the electronic apparatus, there are carried out processings respectively different from each other.

First, under a state in which the electronic apparatus and the mobile station MDT are connected to each other via the interface portions IF1 and IF2 and when a user operates the transmission start button switch to be ON, the data generating portion 4e inputs the latitude and longitude data DGPSxy outputted from the electronic apparatus such as the vehicle mounted navigation apparatus via the interface portions IF1 and IF2 and includes the latitude and longitude data DGPSxy to the received situation data Dcnd, mentioned later, and transmits the data towards the base stations B1 through Bn.

That is, when the user operates the transmission start button switch to be ON, there is carried out a received state measuring processing similar to that of the mobile station MDT according to the second embodiment shown in FIG. 17, further, the data generating portion 4e generates characteristic datas DRC (DMP1 through DMPn, DLY1 through DLYn, DEM1 through DEMn, DEB, Dsp) showing characteristics of a received situation by summarizing the multipath number datas DMP1 through DMPn with identification codes supplied from the multipath number measuring portion 4a, the propagation delay time period datas DLY1 through DLYn with identification codes supplied from the multipath delay amount measuring portion 4b, the multipath electric field intensity data with identification codes DEM1 through DEMn supplied from the multipath electric field intensity measuring portion 4c, the base station electric field intensity data DEB supplied from the base station electric field intensity measuring portion 4d and the speed data Dsp supplied from the moving speed measuring portion 4f.

Further, by adding the latitude and longitude data DGPSxy acquired from the electronic apparatus and the identification code data (telephone number) Did of the mobile station MDT to the characteristic data DRC, the received situation datas Dcnd (DMP1 through DMPn, DLY1 through DLYn, DEM1 through DEMn, DEB, Dsp, DGPSxy, Did) are generated and supplied to the transmitting portion 5 and transmitted towards the base station.

In the state in which the electronic apparatus and the mobile station MDT are not connected to each other, when a user operates the transmission start button switch to be ON, there is carried out a received state measuring processing similar to that of the mobile station MDT according to the second embodiment shown in FIG. 17, further, the data generating portion 4e generates characteristic datas DRC (DMP1 through DMPn, DLY1 through DLYn, DEM1 through DEMn, DEB, Dsp) showing characteristics of a received state by summarizing the multipath number datas DMP1 through DMPn with identification codes supplied from the multipath number measuring portion 4a, the propagation delay time period datas DLY1 through DLYn with identification codes supplied from the multipath delay amount measuring portion 4b, the multipath electric field intensity data with identification codes DEM1 through DEMn supplied from the multipath electric field intensity measuring portion 4c, the base station electric field intensity data DEB supplied from the base station electric field intensity measuring portion 4d and the speed data Dsp supplied from the moving speed measuring portion 4f.

Further, since the apparatus and the mobile station MDT are not connected to each other, there is not carried out the processing for adding the latitude and longitude data to the characteristic data DRC and the identification code data (telephone number) Did is added to the mobile station MDT to thereby generate the received situation datas Dcnd (DMP1 through DMPn, DLY1 through DLYn, DEM1 through DEMn, DEB, Dsp, Did) and supplies the data to the transmitting portion 5 and transmits the data towards the base station.

In this way, when the electronic apparatus and the mobile station MDT are connected to each other, the latitude and longitude data DGPSxy and the received situation data Dcnd including the characteristic datas DRC (DMP1 through DMPn, DLY1 through DLYn, DEM1 through DEMn, DEB, Dsp) measured in the mobile station MDT, are transmitted towards the base station and when the electronic apparatus and the mobile station MDT are not connected to each other, the received situation data Dcnd including the characteristic datas DRC (DMP1 through DMPn, DLY1 through DLYn, DEM1 through DEMn, DEB, Dsp) measured in the mobile station MDT, is transmitted towards the base station.

Further, in both of the case in which the mobile station MDT is connected to the electronic apparatus and the case in which the mobile station MDT is not connected to the electronic apparatus, only when the user operates the transmission start button switch to be ON based on one's own intention, the received situation data Dcnd is transmitted towards the base station to thereby provide a measure of protecting personnel information of the user.

In FIG. 24, the position detection processing portion BDT in each of the base stations B1 through Bn according to the embodiment, is provided with a position data generating portion 18, a charge account processing portion 19 as charge account processing means and a charge data storing portion 12c.

The position data generating portion 18 generates reference data based on received data DRXb (that is, received situation data Dcnd) reproduced by the receiving portion 8, carries out a processing for storing or updating the reference data at the position data storing portion 12a, that is, a processing for constructing a data base and the charge account processing portion 19 carries out a processing for discounting system using charge for a user contributing to constructing the data base.

Describing in further details, when the received situation data Dcnd is supplied from the receiving portion 8, the position data generating portion 18 supplies the identification code data Did in the received situation data Dcnd to the charge account processing portion 19. With regard thereto, the charge account processing portion 19 searches data of users of executing "special contract register" previously stored in the charge data storing portion 12c and determines whether the identification code data Did is of a user executing the "special contract register".

A user executing the "special contract register", mentioned here, is a user of using the mobile communication system and is a user executing special contract stating that the user contributes to constructing the data base by providing the latitude and longitude data DGPSxy from the mobile station MDT to the base station with the enterprise of the mobile communication system. Therefore, a use contractor for simply utilizing the mobile communication system is differentiated from a user executing the "special contract register" although the use contractor is a "system use contractor". Further, for convenience of explanation, a user executing the "special contract register" is referred to as a "special contractor" and a user executing only contract of using the mobile communication system is referred to as a "system user".

When the charge account processing portion 19 determines that the identification code data Did belongs to a "special contractor", a result of determination is supplied to the position data generating portion 18 and a reference data generating processing is started. Further, when the charge account processing portion 19 determines that the identification code data Did does not belong to a "special contractor", a result of the determination is supplied to the position data generating portion 18 and an instruction is given such that the reference data generating processing is not carried out.

When the position data generating portion 18 starts the reference data generating processing in accordance with the result of determination from the charge account processing portion 19, first, it is determined whether the latitude and longitude data DGPSxy is included in the received situation data Dcnd transmitted from the "special contractor".

When the latitude and longitude data DGPSxy is included, the position data generating portion 18 acquires the characteristic datas DRC (DMP1 through DMPn, DLY1 through DLYn, DEM1 through DEMn, DEB, Dsp) included in each of a plurality of the received situation data Dcnd by inputting the received situation data Dcnd reproduced by the receiving portion 8. Further, when the speed data Dsp in the characteristic data DRC is a value larger than a predetermined threshold THDsp, the characteristic data DRC is made to constitute data for generating new reference data, mentioned later. That is, even when the mobile station MDT stays at the same location, there is a case in which radio waves coming at the mobile station MDT from the respective base stations B1 through Bn, are varied by fading, and therefore, when the speed data Dsp in the characteristic data DRC is provided with a value larger than the predetermined threshold THDsp, the characteristic data DRC is determined to represent well the received situation at the mobile station MDT and is made to constitute data for generating new reference data, mentioned later.

Further, when acquisition of the characteristic data DRC has been finished, the position data storing portion 12a is searched and it is investigated whether the same latitude and longitude data as the latitude and longitude data DGPSxy in the characteristic data DRC is stored in the position data storing portion 12a as reference data. At this occasion, when the same latitude and longitude data as the latitude and longitude data DGPSxy is not stored in the position data storing portion 12a yet, new reference datas (DGPSxy; DMP1 through DMPn, DLY1 through DLYn, DEM1 through DEMn, DEB) are generated by corresponding the latitude and longitude data DGPSxy to the characteristic datas DMP1 through DMPn, DLY1 through DLYn, DEM1 through DEMn and DEB indicating the received situation and stored to the position data storing portion 12a, further, the charge account processing portion 19 is informed that the new reference data is stored to the position data storing portion 12a.

In this way, when the charge account processing portion 19 is informed of the information that new reference data is stored to the position data storing portion 12a, the charge account processing portion 19 carries out a processing for executing a discount (hereinafter, referred to as "first kind discount") for contributing to construct the data base from system use charge of the "special contractor" transmitting the received situation data Dcnd and outputs the determination data DCHK1 indicating that the "special contractor" is an object of the "first kind discount".

Further, when as a result of searching the position data storing portion 12a, the same latitude and longitude data as the latitude and longitude data DGPSxy transmitted from the "special contractor", has already been stored in the position data storing portion 12a, the position data generating portion 18 acquires the characteristic datas DRC (DMP1 through DMPn, DLY1 through DLYn, DEM1 through DEMn, DEB, Dsp) included in the received situation data Dcnd by inputting the received situation data Dcnd reproduced by the receiving portion 8 and constitutes data for generating reference data for updating, mentioned later, by the characteristic data DRC when the speed data Dsp in the characteristic data DRC is a value larger than the threshold THDsp. That is, even when the mobile station MDT stays at the same position, there is a case in which radio waves coming at the mobile station MDT from the respective base stations B1 through Bn, is varied by fading, and therefore, when the speed data Dsp in the characteristic data DRC is provided with a value larger than the predetermined threshold THDsp, it is determined that the characteristic data DRC represents well the received situation at the mobile station MDT and the characteristic data DRC is made to constitute data for generating reference data for updating, mentioned later.

Further, after calculating the characteristic data DRC, the position data storing portion 12a is searched and it is investigated whether the characteristic datas DMP1 through DMPn, DLY1 through DLYn, DEM1 through DEMn, DEB included in the characteristic data DRC, is the same as respective characteristic data which has already been stored in the position data storing portion 12a in correspondence with the latitude and longitude data.

When the characteristic datas DMP1 through DMPn, DLY1 through DLYn, DEM1 through DEMn, DEB, are different from the characteristic data which has already been stored therein, by corresponding the characteristic datas DMP1 through DMPn, DLY1 through DLYn, DEM1 through DEMn and DEB included in the characteristic data DRC acquired from the receiving portion 8 to the latitude and longitude data DGPSxy as new characteristic data, there are generated reference datas for updating (DGPSxy; DMP1 through DMPn, DLY1 through DLYn, DEM1 through DEMn, DEB) and the reference data for updating substitutes for the old reference data comprising the latitude and longitude data and the characteristic data which have already been stored and is stored to the position data storing position 12a.

That is, in this case, the new reference data is not newly stored to the position data storing portion 12a but the old reference data existing in the position data storing portion 12a is replaced by the reference data for updating. Further, the charge account processing portion 19 is informed that updating has been carried out. Further, also in the case in which the updating has been carried out, the charge account processing portion 19 carries out the processing of the "first kind discount" for the "special contractor" which has transmitted the received situation data Dcnd and outputs the determination data DCHK1 indicating that the "special contractor" is the object of the "first kind discount".

Further, when it is determined that the latitude and longitude data DGPSxy is not included in the received situation data Dcnd transmitted from the "special contractor", the position data generating portion 18 does not carry out the processing of storing the reference data to the position data storing portion 12a and informs the charge account processing portion 19 of a notice that there is not the latitude and longitude data DGPSxy. Further, when the notice that there is not the latitude and longitude data DGPSxy is received, the charge account processing portion 19 carries out a processing for executing "second kind discount" for the "special contractor" who has transmitted the received situation data Dcnd and outputs determination data DCHK2 indicating that the "special contractor" is an object of the "second kind discount".

In this way, the position data generating portion 18 and the charge account processing portion 19 and the charge data storing portion 12c, carry out the determination whether there is the "special contractor" in cooperation with each other, further, when new reference data is stored to the position data storing portion 12a based on the received situation data Dcnd transmitted from the "special contractor", or when the characteristic data is updated based on the received situation data Dcnd transmitted from the "special contractor", the "special contractor" is made to constitute the object of the "first kind discount", meanwhile, when the latitude and longitude data DGPSxy is not included in the received situation data Dcnd transmitted from the "special contractor", there is carried out the charge account processing of executing charge discount from the system use charge by regarding the "special contractor" as the object of the "second kind discount" and when the received situation data Dcnd is not transmitted from the "special contractor", it is determined that there is not the object of charge discount and there is carried out the charge account processing for collecting the system use charge.

That is, as illustrated in FIG. 27, the "first kind discount" and the "second kind discount" are applied to the "special contractor" based on the predetermined conditions and discount is not applied to a user (noncontractor) who does not execute "special contract register".

Further, the charge account processing portion 19 counts a number of times of constituting the object of the "first kind discount" by the "special contractor" when the new reference data is stored or updating is executed by the reference data for updating, that is, the "special contractor" substantially contributing to constructing the data base and an accumulated count value thereof is stored to the charge data storing portion 12c as history data DG indicating a contribution degree for constructing the data base. Further, the larger the value of the history data DG indicating the contribution degree of the "special contractor", the more increased is the discount rate K of the "first kind discount".

In this way, by adjusting the discount rate K of the "first kind discount", for example, there is provided a difference in the contribution degree between the "special contractor" who has transmitted the received situation data Dcnd which has not been recorded to the position data storing portion 12a yet for a number of times and the "special contractor" who has transmitted the received situation data Dcnd which has already been stored to the position data storing portion 12a for a number of times.

Further, the "special contractor" who has transmitted the received situation data Dcnd which does not include the latitude and longitude data DGPSxy, does not substantially contribute to construct the data base depending on the received situation data Dcnd at that occasion, however, the "special contractor" is made to constitute the object of the "second kind discount" since the "special contractor" owns a vehicle mounted navigation apparatus which can contribute to constructing data base latently.

However, the discount data K of the "first kind discount" is set to be always higher than the discount rate M of the "second kind discount".

In this way, while executing discount to the "special contractor" under the predetermined condition, by generating the new reference data and the reference data for updating based on the received situation data Dcnd transmitted from the "special contractor" and storing and updating the data at the position data storing portion 12a, the data base controlled to file as shown by FIG. 11 through FIG. 15, is automatically constructed.

Further, when the old reference data in the position data storing portion 12a is updated by the reference data for updating, even when the latitude and longitude data DGPSxy remains unchanged, and even when there causes a situation in which there is changed a situation of receiving radio waves from the respective base stations B1 through Bn since, for example, new buildings are constructed at a surrounding of the location of the latitude and longitude data DGPSxy, the data base is updated to the newest content based on the reference data for updating. Therefore, there can be constructed and maintained the newest data base having high accuracy in conformity with actual situation.

Next, an explanation will be given of the position determining portion 10 and the transmitted data generating portion 11 and the optimum candidate determining portion 15. First, a description will be given of an outline thereof. The position determining portion 10 and the transmitted data generating portion 11 and the optimum candidate determining portion 15 carry out a processing for providing information of the current position to a user except the "special contractor" constituting the object of the "first kind discount" in cooperation with each other.

That is, the "special contractor" constituting the object of the "first kind discount" can be informed of the current position by a vehicle mounted navigation apparatus of one's own and therefore, information of the current position is not provided to the "special contractor" constituting the object of the "first kind discount".

However, the information of the current position is proposed to the "special contractor (object of second kind discount)" who removes the mobile station MDT from a vehicle mounted navigation apparatus of one's own and a single member of the mobile station MDT is carried and used since the "special contractor" cannot be informed of the information of the present position.

Further, the information of the current position is proposed to a simple "system user" who does not execute the "special contract register".

Incidentally, when a user who owns an electronic apparatus capable of measuring the current position such as a vehicle mounted navigation apparatus but does not execute the "special contract register", transmits the latitude and longitude data DGPSxy measured by the electronic apparatus and included in the received situation data Dcnd towards the base station, the user is dealt with similarly to the simple "system user" and the information of the current position is provided thereto.

When the receiving portion 8 reproduces and outputs the received situation data Dcnd, the position determining portion 10 inputs the received situation data Dcnd. Further, it is investigated which of the determination datas DCHK1, DCHK2 and DCHK3 are outputted from the charge account processing portion 19.

Further, when determination data DCHK1 is outputted, as described above, it is determined that the received situation data Dcnd is transmitted from the "special contract" constituting the object of the "first kind discount", there is not carried out a processing for returning the information of the current position and an instruction is given to the transmitted data generating portion 11 and the optimum candidate determining portion 15 not to carry out the processing for returning the information of the current position.

Meanwhile, when the determination data DCHK2 or DCHK3 is outputted from the charge account processing portion 19, in cooperation with the transmitted data generating portion 11 and the optimum candidate determining portion 15, there is started the processing for returning the information of the current position to the "special contractor" or the "system user" constituting the object of the "second kind discount".

When the position determining portion 10 starts the processing for returning the information of the current position in this way, there is inputted the data DRXb reproduced by the receiving portion 8, that is, the received situation datas Dcnd (DMP1 through DMPn, DLY1 through DLYn, DEM1 through DEMn, DEB, Dsp, Did) transmitted from the mobile station MDT, there is searched reference data in the position data storing portion 12a shown in FIG. 12 through FIG. 15, there are determined a plurality of pieces of reference data similar to the characteristic datas DMP1 through DMPn, DLY1 through DLYn, DEM1 through DEMn and DEB and the plurality of pieces of latitude and longitude data DRxy in correspondence with the result of the determination is supplied to the optimum candidate determining portion 15.

Further, the speed data Dsp in the received situation data Dcnd is also transmitted to the optimum candidate determining portion 15 along with the latitude and longitude data DRxy.

Further, when there are determined the plurality of pieces of reference data similar to the respective characteristic datas DMP1 through DMPn, DLY1 through DLYn, DEM1 through DEMn and DEB, by carrying out a comparatively liberal determination constituting an object of determination even by reference data in which only a portion of data of the characteristic datas DMP1 through DMPn, DLY1 through DLYn, DEM1 through DEMn and DEB are similar, the plurality of pieces of latitude and longitude data DRxy in correspondence with the result of the determination, is supplied to the optimum candidate determining portion 15. Further, by calculating correlations between the characteristic datas DMP1 through DMPn, DLY1 through DLYn, DEM1 thorough DEMn and DEB and the reference data, the reference data having a correlation value equal to or larger than a predetermined value is determined to be similar.

Further, the position determining portion 10 does not determine the plurality of pieces of latitude and longitude data DRxy by inputting the received situation data Dcnd transmitted from the side of the mobile station MDT only once but the received situation data Dcnd transmitted from the side of the mobile station MDT, is inputted during a constant period a plurality of times, there are determined a plurality of pieces of reference data similar to the characteristic datas DMP1 through DMPn, DLY1 through DLYn, DEM1 through DEMn and DEB provided at the respective times and the plurality of pieces of latitude and longitude data DRxy in correspondence with a result of the determination is supplied to the optimum candidate determining portion 15. Further, according to the embodiment, the received situation data Dcnd is inputted three times.

Therefore, the position determining portion 10 determines the plurality of pieces of latitude and longitude data DRxy and supplies them to the optimum candidate determining portion 15 at every time of receiving the received situation data Dcnd.

The optimum candidate determining portion 15 generates the optimum position data MRxy indicating the current position of the mobile station MDT based on the plurality of pieces of latitude and longitude data DRxy supplied from the position determining portion 10 over a plurality of times.

Figure 20:
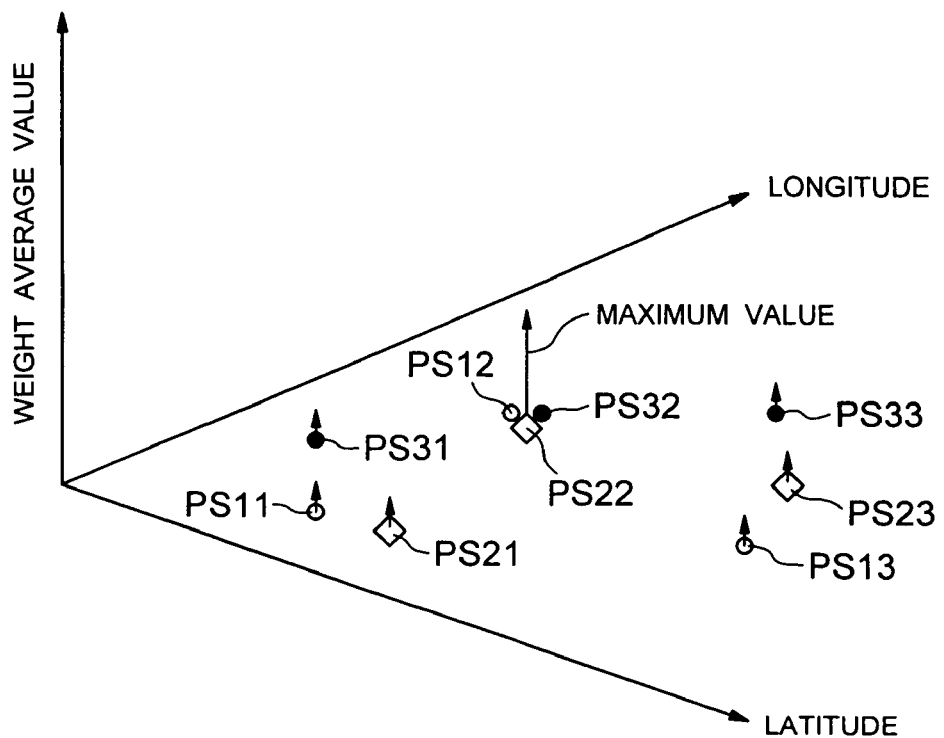
FIG. 20 is a diagram for explaining a method of measuring a position of a mobile station.

That is, similarly to what is illustrated in FIG. 20, the plurality of pieces of latitude and longitude data DRxy supplied from the position determining portion 10 are aligned on the coordinates of the latitude and the longitude, there are accumulatedly added numbers of times of occurrences of the same data and the gravitational center position (latitude and longitude) constituting the largest value in a distribution of an average value subjected to the accumulated addition, is determined as the potential candidate MRxy' representing the current position of the mobile station MDT.

For example, when a plurality of pieces of the latitude and longitude data DRxy at a first time supplied from the position determining portion 10, are defined as PS11 through PS13, the latitude and longitude data DRxy at a second time are defined as PS21 through PS23 and the latitude and longitude data DRxy at a third time are defined as PS31 through PS33, the latitude and longitude datas PS11 through PS13, PS21 through PS23 and PS31 through PS33 are respectively aligned, numbers of times of occurrence of the same data are accumulatedly added and the gravitational center position (latitude and longitude) constituting the largest value in the distribution of average value subjected to the accumulated addition, is determined as the potential candidate MRxy' representing the current position of the mobile station MDT.

Further, a value of the speed data Dsp is compared with the predetermined threshold THDsp, when there is provided the speed data Dsp having a value larger than the threshold THDsp, it is determined that the candidate MRxy' shows the current position of the mobile station MDT and the candidate MRxy' is made to constitute the optimum position data MRxy (MRxy') and supplied to the transmitted data generating portion 11.

Meanwhile, when there is not provided the speed data Dsp having the value larger than the threshold THDsp, the optimum position data MRxy calculated at a preceding processing is made to constitute the optimum position data MRxy and is supplied to the transmitted data generating portion 11.

In this way, the optimum candidate determining portion 15 investigates the frequency of occurrence of the plurality of pieces of latitude and longitude data MRxy, there is generated the optimum position data MRxy showing the current position of the mobile station MDT based on the latitude and the longitude having the highest frequency of occurrence, thereby, the current position of the mobile station MDT is detected with high accuracy.

Further, in the case of communication of a multiple connection system such as W-CDMA, even when a distance from the base station to the mobile station stays the same, the electric field intensity of a radio wave coming therefrom is significantly changed by influence of fading and generally, when the moving speed of the base station is small, a dispersion in the electric field intensity is increased. However, when the speed data Dsp showing the moving speed of the mobile station MDT becomes larger than the predetermined threshold THDsp, it is determined that the optimum position data MRxy is data showing the current position of the mobile station MDT and therefore, the current position of the mobile station MDT can be detected with extremely high accuracy.

When the optimum position data MRxy is supplied, the transmitted data generating portion 11 searches the proposed data storing portion 12b based on the optimum position data MRxy and acquires map data of the location shown by the optimum position data MRxy and a periphery thereof. Further, the transmitted data DTXb is generated by combining the optimum position data MRxy and the map data and is transmitted towards the mobile station MDT via the transmitting portion 13.

When the transmitted data DTXb is transmitted in this way, the mobile station MDT shown in FIG. 23 receives the transmitted data DTXb as the received data DRXm, and the data processing portion and system controller 3 displays map data and the optimum position data MRxy included in the transmitted data DTXb and provides the current position of the user in a visually easy-to-see state.

Next, an explanation will be given of operation of the communication system according to the embodiment in reference to flowcharts shown by FIG. 25 and FIG. 26. Further, FIG. 25 shows operation of the mobile station MDT shown in FIG. 23 and FIG. 26 shows operation of the position detection processing portion BDT shown in FIG. 24.

Figure 25:
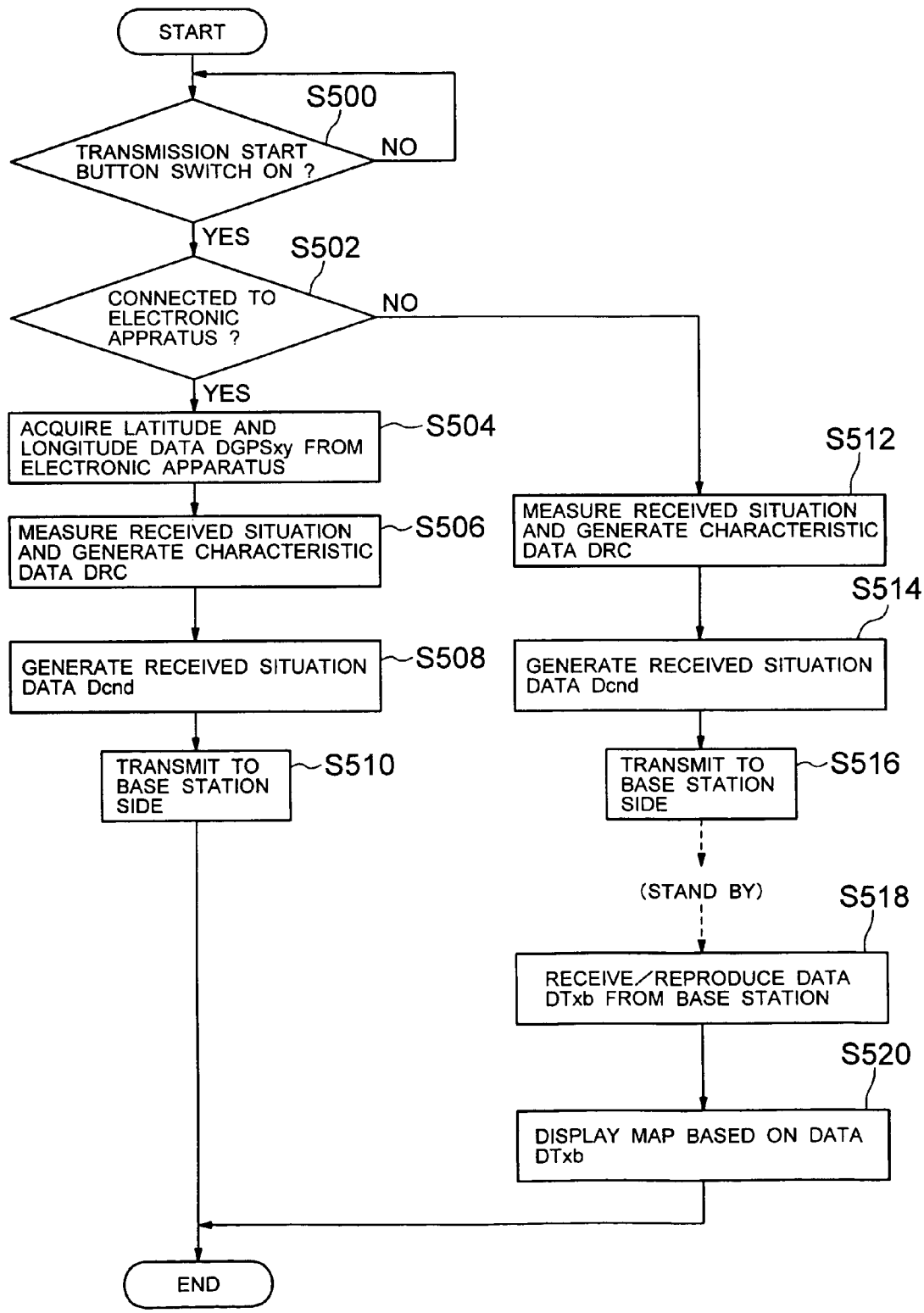
FIG. 25 is a flowchart for explaining operation of the mobile station according to the third embodiment.
Figure 26:
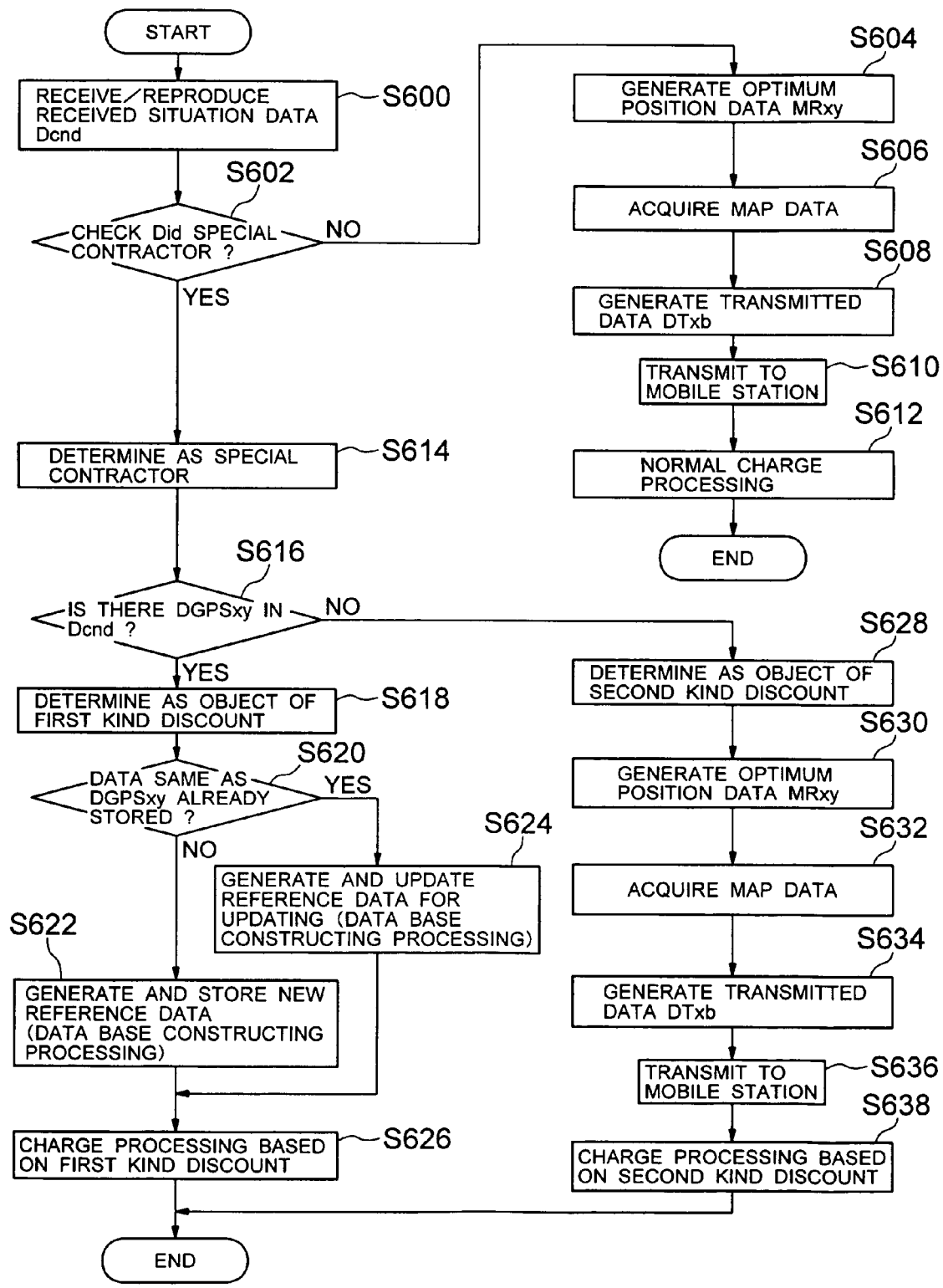
FIG. 26 is a flowchart for explaining operation of the base station according to the third embodiment.

In FIG. 25, when the transmission start button switch provided at the mobile station MDT owned by the user executing the "special contract register", is operated to be ON (step S500), the data processing portion and system controller 3 detects it and thereafter, it is investigated whether the mobile station MDT is connected to an electronic apparatus such as vehicle mounted navigation apparatus (step S502). When the mobile station MDT is connected to the electronic apparatus, the data generating portion 4e acquires the latitude and longitude data DGPSxy measured by the electronic apparatus (step S504) and there is carried out a processing of measuring a received situation by the cell search portion 6 and the respective measuring portion 4a through 4f and there is formed the characteristic data DRC indicating characteristics of the measured received situation (step S506). Next, the data generating portion 4e generates the received situation data Dcnd having the latitude and longitude data DGPSxy and the characteristic data DRC and the identification code data Did (step S508), transmits the received situation data Dcnd towards the base station (step S510) and there is finished a processing for providing information contributing to constructing the data base.

In this way, when the received situation data Dcnd is transmitted towards the base station, a user executing the "special contract register" can receive application of the "first kind discount" or the "second kind discount", mentioned later.

Meanwhile, when the mobile station MDT is not connected to the electronic apparatus at step S502, the operation proceeds to step S512, there is carried out the processing of measuring the received situation by the cell search portion 6 and the respective measuring portions 4a through 4f and the characteristic data DRC indicating the characteristics of the measured received situation is generated (step S512). Further, the data generating portion 4e generates the received situation data Dcnd having the characteristic data DRC and the identification code data Did (step S514), transmits the received situation data Dcnd towards the base station (step S516) and thereafter, there is brought about a standby state until data is returned from the base station.

That is, when the received situation data Dcnd which does not include the latitude and longitude data DGPSxy, is transmitted towards the base station, there is brought about the standby state until information indicating the current position of the mobile station MDT is returned from the base station.

Further, when data DTXb is returned from the base station at step S636, mentioned later, the data DTXb is received and reproduced (step S518), further, the data processing portion and system controller 3 displays the optimum position data MRxy and the map data included in the data DTXb on a display and provides them to the user.

Further, when the user executing the "special contract register" transmits the received situation data Dcnd which does not include the latitude and longitude data DGPSxy towards the base station, there is applied the "second kind discount".

Further, even in the case in which a user who does not execute the "special contract register", owns the mobile station MDT and the user operates the transmission start button switch to be ON at step S500, the transmission to the base station is carried out at step S510 or S516 in accordance with presence or absence of connection to the electronic apparatus. However, in this case, the position detection processing portion BDT on the side of the base station determines that the user is a "non contractor" and when at step S518, the data DTXb is returned from the base station, the charge account processing portion 19 in the position detection processing portion BDT collects normal system use charge having no discount.

Next, an explanation will be given of operation of the position detection processing portion BDT in reference to FIG. 26. When the received situation data Dcnd is transmitted from the mobile station MDT towards the base station at step S510 or S516, the position detection processing portion BDT in the base station present at a location capable of receiving the received situation data Dcnd receives and reproduces the received situation data Dcnd (step S600).

Next, the identification code data Did in the received situation data Dcnd is checked and it is checked whether the received situation data Dcnd is transmitted from a "special contractor" (step S602).

In this case, when it is determined that data is not transmitted from the "special contractor", the operation proceeds to step S604, the reference data in the position data storing portion 12a is searched based on the characteristic data DRC included in the received situation data Dcnd and there is generated the optimum position data MRxy indicating the current position of the mobile station MDT based on the searched reference data. Further, there is searched and acquired map data in the proposed data storing portion 12b based on the optimum position data MRxy (step S606), there is generated the transmitted data DTXb having the optimum position data MRxy and the map data (step S608), and the transmitted data DTXb is transmitted (returned) to the mobile station MDT transmitting the received situation data Dcnd (step S610).

Further, the charge account processing portion 19 carries out a charge account processing for collecting use charge for the user (noncontractor) who has transmitted the received situation data Dcnd and who is not the "special contractor" in exchange for provision of the optimum position data MRxy and the map data.

When the identification code data Did belongs to the "special contractor" at step S602, the "special contractor" is determined at step S614 and thereafter, it is investigated whether the latitude and longitude data DGPSxy is present in the received situation data Dcnd (step S616).

In this case, when there is present the latitude and longitude data DGPSxy, the operation proceeds to step S618 and determines the "special contractor" who has sent the received situation data Dcnd as the object of the "first kind discount" and when there is not present the latitude and longitude data DGPSxy, the operation proceeds to step S628 and determines the "special contractor" who has sent the received situation data Dcnd as the object of the "second kind discount".

When the "special contractor" is determined as the object of the "first kind discount" at step S618, successively, it is investigated whether the same latitude and longitude data as the transmitted latitude and longitude data DGPSxy has already been stored in the position data storing portion 12a (step S620) and when the data has not been stored yet (case of "No"), new reference data is generated by corresponding the characteristic data DRC included in the received situation data Dcnd to the latitude and longitude data DGPSxy and stored to the position data storing portion 12a (step S622).

Meanwhile, when the data has already been stored (case of "Yes"), reference data for updating is generated based on the characteristic data DRC included in the received situation data Dcnd and characteristic data of old reference data stored in the position data storing portion 12a is replaced and updated by the reference data for updating (step S624). That is, only when the old reference data is different from the characteristic data, the reference data for updating is generated based on the characteristic data DRC and the above-described updating operation is carried out.

Further, when there is finished the processing at S622 or step S624, that is, the processing for constructing the data base, there is accumulatedly counted a number of times of contributing to constructing the data base by the object of the "first kind discount", the charge account processing of the "first kind discount" is carried out based on the accumulated number of times (step S626) and the processing is finished.

When the operation proceeds from step S616 to step S628 and the "special contractor" who has transmitted the received situation data Dcnd is determined as the object of the "second kind discount", successively, there is searched reference data in the position data storing portion 12a based on the characteristic data DRC included in the received situation data Dcnd and there is generated the optimum position data MRxy showing the current position of the mobile station MDT based on the searched reference data (step S630). Further, there is searched and acquired map data in the proposed data storing portion 12b based on the optimum position data MRxy (step S632), there is formed the transmitted data DTXb having the optimum position data MRxy and map data (step S634) and the transmitted data DTXb is transmitted (returned) to the mobile station MDT transmitting the received situation data Dcnd (step S636).

Further, the charge account processing portion 19 carries out the charge account processing based on the "second kind discount" for the "special contractor" transmitting the received situation data Dcnd (step S638) and the processing is finished.

In this way, according to the embodiment, there is achieved an excellent effect of capable of constructing the reference data to be stored to the position data storing portion 12a based on the received situation data Dcnd from the mobile station MDT. Particularly, there is accompanied a difficulty in actually measuring position information in a wide communication area, however, data base is constructed based on the received situation data Dcnd from the mobile station MDT owned by a user and therefore, there can be constructed the data base having high accuracy in compliance with actual situation.

Further, by discounting an amount for contribution of a user who has executed the special contract register to constructing the data base, promotion of service to the user can be achieved.

Further, by storing or updating new reference data or reference data for updating in the position data storing portion 12a, with regard to the "special contractor" substantially contributing to constructing the data base, a number of times of contribution is counted and the discount rate is increased in accordance with the accmulatedly counted value and therefore, rational discount can be carried out between the user and the enterprise of the mobile communication system.

Further, in a general case in which the mobile station MDT is removed from the vehicle mounted navigation apparatus and is used outside of the vehicle, the user who is the "special contractor" is provided with information of the current position from the side of the base station and therefore, promotion of convenience for the user can be achieved.

Further, since there is adopted the mode in which the mobile station MDT utilizes the latitude and longitude data DGPSxy supplied form the electronic apparatus such as the vehicle mounted navigation apparatus and transmits it towards the base station, there is achieved an effect that it is not necessary to provide means for detecting position such as the GPS apparatus to the mobile station MDT per se. For example, when the GPS apparatus is provided to the mobile station MDT per se, there poses a problem that it becomes necessary for the mobile station MDT to include a battery having a large capacity and the portability is deteriorated, however, according to the embodiment, the position is detected by a power source on the side of the electronic apparatus such as the vehicle mounted navigation apparatus and therefore, it is not necessary for the mobile station MDT per se to include the battery having the large capacity and the problem of deteriorating the portability can be prevented beforehand.

However, the invention does not negate to always install the GPS receiving apparatus at the mobile station MDT per se but there may be constructed a structure in which the GPS receiving apparatus is normally installed at the mobile station MDT and a unitized GPS receiving apparatus is attachably and detachably installed at the mobile station MDT.

Further, the received situation data Dcnd is transmitted towards the base station only when the user operates the predetermined transmission start button switch to be ON and therefore, there is achieved an effect of capable of protecting personal information under responsibility of the user.

Further, there may be constructed a constitution in which the received situation data Dcnd is transmitted towards the base station not only when a user operates the transmission start button switch to be ON but, for example, at respective constant periods and there is given a description stating thereof in content (memorandum) of the "special contract register" and the content of discount is provided with a variation.

Further, although according to the embodiment, the data of the current position (optimum position data MRxy) is not provided to a person applied with the "first kind discount", there may be constructed a constitution of providing at least map data. According to such constitution, there is achieved an effect of capable of providing the newest map data from the side of the base station to the user and downloading the newest map data to the vehicle mounted navigation apparatus owned by the user and promotion of service to the user can be achieved.

Further, although according to the embodiment, the movement location of the mobile station MDT is detected based on all of data of the multipath number, the multipath delay time period, multipath electric field intensity and the base station electric field intensity, the current position of the mobile station MDT can finely be detected with no practical problem without depending on all the information.

In this way, the mobile communication system can realize the diversified mobile communication environment, for example, the mobile communication system capable of dealing with a diversified business model.

Further, although according to the first through the third embodiments explained above, an explanation has been given of the case in which the mobile station MDT is a portable telephone as a typical example, the invention is not limited to the portable telephone but is applicable to a mobile terminal apparatus for transmitting and receiving various data, a personnel computer having a communication function and a portable navigation system and does not limit the mode of use.

As has been explained above, according to the invention, a mobile station receives a plurality of radio waves coming from base stations, there is detected a situation of correlating the received radio waves and based on the correlation situation, the position of the mobile station is detected by the mobile station or the side of the base station and therefore, the position is detected in compliance with an actual environment (received situation) at a surrounding of the mobile station and there can be realized to detect the position with high accuracy.

Further, there is transmitted proposed data in correspondence with the detected position, that is, data inherent to the location from the base station to the mobile station and therefore, various data can be provided to a user on the side of the mobile station and there can be proposed a mobile communication system capable of dealing with a diversified mobile communication environment.

This application is based on Japanese patent applications Nos. 2000-218000, 2000-218001, 2000-218002, 2000-218003 and 2000-218004 which are hereby incorporated by reference.

What is claimed is:

1. A mobile communication system including a plurality of base stations positioned within a communication area each for emitting a radio wave inherent thereto and a mobile station moving within the communication area and communicating with the respectives of the base stations via the transmitted radio waves, said system comprising:

location correlation data group storing means for previously storing a location correlation data group including correlation data respectively representing correlation situation of a plurality of arriving radio waves produced by the transmitted radio waves at respectives of a plurality of sampling locations within the communication area as location correlation data respectively corresponding to the locations;

current correlation data calculating means for receiving the arriving radio waves at a current position of the mobile station and calculating current correlation data respectively representing the correlation situations among the arriving radio waves for the respective mobile stations; and current position determining means for comparing the location correlation data in the location correlation data group and the current correlation data and determining the current position of the mobile station in accordance with a result of the comparison thereby to generate information of the determined current position, wherein the correlation data representing the correlating situation is at least one of a multipath occurrence rate, a delay time period between the multipaths and an electric field intensity of each of the multipaths.

2. The mobile communication system according to claim 1,
wherein the current correlation data calculating means is mounted to the mobile station.

3. The mobile communication system according to claim 1, further comprising:
displaying means for displaying the determined current location.

4. The mobile communication system according to claim 3,
wherein the displaying means is mounted to the mobile station.

5. The mobile communication system according to claim 3,
wherein the displaying means displays the determined current location on a map.

6. The mobile communication system according to claim 1, further comprising:
determined current position transmitting and receiving means for transmitting and receiving the information of the determined current position between the base station and the mobile station as well as information of identifying the mobile station.

7. The mobile communication system according to claim 1, further comprising:

location inherent data holding means for holding location inherent data inherent to the respectives of the sampling locations; and location inherent data transmitting and receiving means for transmitting and receiving the location inherent data at one of the sampling locations equal to the determined current position, between the base station and the mobile station.

8. The mobile communication system according to claim 1,
wherein the electric field intensity is normalized on the basis of a maximum level in the multipaths at the current position while the maximum level is a reference for the normalization.

9. The mobile communication system according to claim 1,
wherein the sampling location belongs to any one of cell areas allocated to the respective base stations.

10. The mobile communication system according to claim 1,
wherein the determining means determines the current position of the mobile station in accordance with the result of comparison of comparing the data at respective predetermined repetition periods.

11. The mobile communication system according to claim 10,
wherein the determining means repeats its comparison operations at intervals and determines a comparison result at a preceding time as a comparison result at a current time when a moving speed of the mobile station is equal to or smaller than a predetermined speed.

12. The mobile communication system according to claim 1,
wherein the determining means performs the comparison by a degree of coincidence between the location correlation data and the current correlation data.

13. The mobile communication system according to claim 12,
wherein the determining means provides a plurality of the coincidence degrees in terms of the sampling locations as parameters and determining the current position to be the sampling location in correspondence with the highest coincidence degree among them.

14. The mobile communication system according to claim 12,
wherein the determining means provides a plurality of the coincidence degrees in terms of the sampling locations as parameters, provides a distribution state of coincidence degrees representing a distribution state in terms of the sampling locations and determines the current position to be a gravitational center position of the coincidence degree distribution state.

15. The mobile communication system according to claim 1, further comprising:
position measuring means mounted to the mobile station for generating an actually measured position data provided through its actual measurement of the current position of the mobile station;
wherein the determining means reflects a content of the measured position data to the determined current position.

16. The mobile communication system according to claim 15, further comprising:
measured position data transmitting and receiving means for transmitting and receiving the measured position data between the base station and the mobile station in accordance with only an operation instruction input.

17. The mobile communication system according to claim 16, further comprising:

account means for carrying out a charge account processing for the respective mobile station at an occurrence of transmission and reception operation by the measured position data transmitting and receiving means.

18. The mobile communication system according to claim 17, wherein the account means varies a charge account content in accordance with a number of times of operation of transmission and reception of the measured position data for the respective mobile stations.

19. A method of determining a position of a mobile station, comprising:

storing a location correlation data group, including correlation data representing respective correlation situations of a plurality of received radio waves at respective sampling locations within a communication area, as location correlation data corresponding to respective sampling locations;

receiving radio waves at a current position of the mobile station;

calculating current correlation data representing respective correlation situations among the received radio waves;

comparing the location correlation data in the location correlation data group and the current correlation data; and determining a current position of the mobile station, in accordance with a result of the comparison, thereby to generate information of the determined current position, wherein the correlation data representing the correlating situations is at least one of a multipath occurrence rate, a delay time period between the multipaths and an electric field intensity of each of the multipaths.

\* \* \* \* \*